(12) United States Patent
Srivastava et al.

(10) Patent No.: US 12,473,503 B2
(45) Date of Patent: Nov. 18, 2025

(54) HYDROCARBON PYROLYSIS OF FEEDS CONTAINING SULFUR

(71) Applicant: ExxonMobil Chemical Patents Inc., Baytown, TX (US)

(72) Inventors: Alok Srivastava, Houston, TX (US); Rodney S. Smith, Edinburgh (GB); James P. Chapman, Houston, TX (US)

(73) Assignee: ExxonMobil Engineering and Technology Company, Spring, TX (US)

( * ) Notice: Subject to any disclaimer, the term of this patent is extended or adjusted under 35 U.S.C. 154(b) by 128 days.

(21) Appl. No.: 17/904,682

(22) PCT Filed: Mar. 9, 2021

(86) PCT No.: PCT/US2021/021594
§ 371 (c)(1),
(2) Date: Aug. 19, 2022

(87) PCT Pub. No.: WO2021/183580
PCT Pub. Date: Sep. 16, 2021

(65) Prior Publication Data
US 2023/0091233 A1 Mar. 23, 2023

Related U.S. Application Data

(60) Provisional application No. 62/988,278, filed on Mar. 11, 2020.

(30) Foreign Application Priority Data

Jul. 29, 2020 (EP) .................................... 20188287

(51) Int. Cl.
*C10G 55/04* (2006.01)
*C07C 4/06* (2006.01)
(Continued)

(52) U.S. Cl.
CPC ................. *C10G 55/04* (2013.01); *C07C 4/06* (2013.01); *C07C 5/05* (2013.01); *C10G 69/06* (2013.01);
(Continued)

(58) Field of Classification Search
CPC ... C10G 55/04; C10G 69/06; C10G 2300/207
See application file for complete search history.

(56) References Cited

U.S. PATENT DOCUMENTS 2,998,382 A   8/1961 Herman et al.
3,107,213 A   10/1963 Cole et al.
(Continued)

FOREIGN PATENT DOCUMENTS

CA   2639202 A1 * 3/2009 ............... B01J 23/85
WO   2019/239353 A1  12/2019
(Continued)

OTHER PUBLICATIONS

Extended European Search Report received for European Patent Application No. 20188287.5, mailed on Jan. 29, 2021, 10 Pages.
(Continued)

*Primary Examiner* — Ellen M McAvoy
*Assistant Examiner* — Ming Cheung Po

(57) ABSTRACT

The present disclosure relates to processes, apparatuses, and systems for the removal of sulfur compounds from a heavy hydrocarbon feed as part of steam cracking processes to produce light olefins. In at least one embodiment, the process includes introducing a hydrocarbon feed having a first sulfur content to a steam cracker to produce a steam cracker effluent having a second sulfur content less than the first sulfur content. The process includes introducing the steam cracker effluent to a fractionation system to produce a light hydrocarbon product stream having a third sulfur content less than the second sulfur content.

23 Claims, 2 Drawing Sheets

(51) Int. Cl.
*C07C 5/05* (2006.01)
*C10G 69/06* (2006.01)

(52) U.S. Cl.
CPC . *C10G 2300/202* (2013.01); *C10G 2300/207* (2013.01)

(56) References Cited

U.S. PATENT DOCUMENTS

| | | | |
|---|---|---|---|
| 4,100,257 A | 7/1978 | Sartori et al. | |
| 4,112,051 A | 9/1978 | Sartori et al. | |
| 4,217,237 A | 8/1980 | Sartori et al. | |
| 4,217,238 A | 8/1980 | Sartori et al. | |
| 4,894,178 A | 1/1990 | Ho et al. | |
| 5,209,828 A | 5/1993 | Chou et al. | |
| 5,220,097 A * | 6/1993 | Lam | C10G 5/04 585/259 |
| 5,871,634 A | 2/1999 | Wiehe et al. | |
| 6,210,561 B1 | 4/2001 | Bradow et al. | |
| 6,632,351 B1 | 10/2003 | Ngan et al. | |
| 7,090,765 B2 | 8/2006 | Spicer et al. | |
| 7,097,758 B2 | 8/2006 | Stell et al. | |
| 7,138,047 B2 | 11/2006 | Stell et al. | |
| 7,220,887 B2 | 5/2007 | Stell et al. | |
| 7,235,705 B2 | 6/2007 | Stell | |
| 7,244,871 B2 | 7/2007 | Stell et al. | |
| 7,247,765 B2 | 7/2007 | Stell et al. | |
| 7,297,833 B2 | 11/2007 | Beattie et al. | |
| 7,311,746 B2 | 12/2007 | Stell et al. | |
| 7,312,371 B2 | 12/2007 | Stell et al. | |
| 7,351,872 B2 | 4/2008 | Stell et al. | |
| 7,427,385 B2 | 9/2008 | Scheirer et al. | |
| 7,488,459 B2 | 2/2009 | Stell et al. | |
| 7,578,929 B2 | 8/2009 | Stell et al. | |
| 7,820,035 B2 | 10/2010 | Mccoy et al. | |
| 7,972,498 B2 | 7/2011 | Buchanan et al. | |
| 8,083,931 B2 | 12/2011 | Mccoy et al. | |
| 8,684,384 B2 | 4/2014 | Spicer et al. | |
| 11,473,023 B2 | 10/2022 | Evans et al. | |
| 2007/0163921 A1 | 7/2007 | Keusenkothen et al. | |
| 2009/0036727 A1 * | 2/2009 | Kurukchi | C10G 70/00 585/854 |
| 2009/0057200 A1 | 3/2009 | Leta et al. | |
| 2010/0293854 A1 * | 11/2010 | Mak | C10K 1/143 48/197 R |
| 2011/0005970 A1 * | 1/2011 | Ou | C10G 51/04 208/44 |
| 2016/0376511 A1 | 12/2016 | Srivastava et al. | |

FOREIGN PATENT DOCUMENTS

| | | |
|---|---|---|
| WO | 2020/096977 A1 | 5/2020 |
| WO | 2021/183580 A1 | 9/2021 |

OTHER PUBLICATIONS

International Preliminary Report on Patentability received for PCT Application No. PCT/US2021/021594, mailed on Sep. 22, 2022, 10 Pages.

International Search Report and Written Opinion received for PCT Application No. PCT/US2021/021594, mailed on Apr. 23, 2021, 13 Pages.

"SOP-2 Sulfur Contaminant Map Report" dated Apr. 14, 2014.

* cited by examiner

HYDROCARBON PYROLYSIS OF FEEDS CONTAINING SULFUR

CROSS-REFERENCE TO RELATED APPLICATIONS

This application is a US national phase application of PCT Application Serial No. PCT/US2021/021594 having a filing date of Mar. 9, 2021, which claims priority to and the benefit of U.S. Provisional Application No. 62/988,278 having a filing date of Mar. 11, 2020 and European Patent Application No. 20188287.5 having a filing date of Jul. 29, 2020, the disclosures of all of which are incorporated herein by reference in their entireties.

FIELD

The invention relates to hydrocarbon pyrolysis, e.g., the steam cracking of feeds comprising hydrocarbon and sulfur-containing compositions. The invention also relates to equipment, systems, and apparatus useful for such pyrolysis, to the products and by-products of such pyrolysis, and to the further processing of such products and co-products, e.g., by polymerization.

BACKGROUND

A variety of refinery process streams can be produced by processing raw feeds such as crude oil. Many of these refinery process streams are utilized as (and/or included in) feeds for hydrocarbon pyrolysis processes such as steam cracking. Steam cracking produces useful products such as light olefin from feeds ("steam cracker feeds") comprising hydrocarbon ("hydrocarbon feeds") and steam. Besides molecular hydrogen, saturated hydrocarbon, and water, steam cracking produces unsaturated products, e.g., olefins, such light ($C_{4-}$) olefins including ethylene and propylene. Steam cracking also produces steam cracker tar ("SCT", which can be used as a fuel oil), pygas, steam cracker gas oil, etc.

Some of refinery streams that are used as the hydrocarbon feed for a steam cracking process are primarily vapor phase at a temperature of 25° C. and a pressure of 1 bar (abs). Others are primarily liquid phase under these conditions, e.g., refinery streams such as naphtha, gas oil, resids, etc. Besides those available from refining processes, primarily liquid-phase hydrocarbon feeds may be obtained from other petrochemical facilities, or from sources such as pipelines, transport vessels, tankage, etc. An advantage of obtaining such feeds from refining processes is that the refining processes used to produce the hydrocarbon feed typically removes various forms of sulfur (e.g., sulfur and other sulfur-containing compositions such as sulfur compounds) that are typically present in refinery feed. For example, in many refinery product streams sulfur is present mainly as hydrogen sulfide ($H_2S$). The $H_2S$ can be removed from these refinery streams before steam cracking, e.g., by conventional methods such as amine and/or caustic treatment. Other sulfur species in these streams typically are in sufficiently small content that the stream does not appreciably impact the steam cracking plant's product and co-product recovery facility.

Over time, demand growth for light olefins has exceeded that of refinery products (e.g., fuels and lubricating oils), and this trend is expected to continue. As a result, both the number and size of new or revamped steam cracker plants has exhibited a significant increase in comparison with the number and size of new or revamped refineries. The resulting demand increase for primarily liquid-phase hydrocarbon feeds has increased interest in utilizing heavier liquid-phase feeds, e.g., those primarily liquid-phase hydrocarbon feedstocks having an API gravity less than that of naphtha ("relatively-heavy primarily liquid-phase hydrocarbon feeds", also called "advantaged feeds"). Although advantaged feeds can include those that have been subjected to prior processing, such as certain gas oils, advantaged feeds also can include raw feeds such as crude oils, e.g., crude oils comprising medium hydrocarbon and/or heavy hydrocarbon. For example, utilizing advantaged feeds comprising raw feedstocks, e.g., various crude oils, would increase the supply of available liquid feeds, and would decrease the steam cracker plant's dependence on refinery process streams to satisfy steam cracker feed needs. This in turn would improve plant economics, e.g., by decreasing light olefin production costs, and by making relatively high-value refinery streams available for other purposes.

The amount of sulfur contained in advantaged feeds can be an obstacle to utilizing them for steam cracking. Many advantaged feeds, including a majority of the world's crude oils, are sour. Although sour feeds are generally less expensive, the high sulfur content can lead to steam cracking difficulties. Utilizing a sour hydrocarbon as a steam cracker feed may lead to increased corrosion in process equipment, e.g., from acidic sulfur species present in the feed. Utilizing a sour hydrocarbon feed also may necessitate specialized equipment and extra processing in the steam cracking plant and in related facilities to provide, for example, a fuel oil such as low sulfur fuel oil LSFO).

Steam cracking a sour hydrocarbon feed, such as those derived from high sulfur crude oil, typically produces steam cracker products comprising several sulfur species, e.g., $H_2S$, ethyl mercaptan, methyl mercaptan, carbonyl sulfide, other sulfides, carbon disulfide and various thiophenes. Particularly when utilizing hydrocarbon feeds comprising crude oil, a moderate to high content of these sulfur-containing impurities can be present in the feed, and this in turn can lead to processing difficulties such as catalyst poisoning in recovery facilities located downstream of the steam cracker. Since the limit of sulfur compounds in product or reactor feed may be small, e.g., on the order of a few parts per million, it can be critical to understand the distribution and removal efficiency of various sulfur removal processes in order to properly manage the amounts of such sulfur compounds in downstream products.

Conventional methods have been developed for removing sulfur from hydrocarbon feeds before steam cracking is carried out. Although feed hydroprocessing has been proposed, this method is costly and typically results in undesirable conversion of feed hydrocarbon compounds products of lesser value such as methane. Another conventional method utilizes a flash separation vessel integrated with a steam cracking furnace's convection section. Doing so removes and conducts away at least some of the hydrocarbon feed's sulfur before steam cracking is carried out in the furnace's radiant section. Further improvements are needed, however, as limits on steam cracker product sulfur content become increasingly stringent.

In particular, improved systems, methods, and processes are needed to manage sulfur found in advantaged feeds or produced by the steam cracking of advantaged feeds, e.g. raw feeds such as crude oil. It is desired to efficiently manage sulfur-containing compositions in hydrocarbon feeds for steam cracking in order to: (i) meet increasingly stringent product specifications; (ii) decrease operational costs of the steam cracking plant, e.g., those associated with catalyst poisoning in the plant's recovery facility; and/or (iii) reduce operating costs associated with corrosion from sulfur-containing compounds, e.g., $H_2S$.

SUMMARY

We have found that steam cracking a hydrocarbon feed comprising sulfur at a high concentration, e.g., a crude, can result in the production of many sulfur-containing compounds at relatively high concentrations thereof in the steam cracker effluent, e.g., $H_2S$, methyl mercaptan ($CH_3SH$), ethyl mercaptan ($C_2H_5SH$), COS, $CS_2$, dimethyl sulfide ($CH_3SCH_3$), C5 range sulfur-containing organic compounds, and C6+ range sulfur-containing organic compounds, which are typically not present or present only at very low quantity in a comparative steam cracker effluent produced from steam cracking a low-sulfur hydrocarbon feed such as ethane, propane, and naphtha. Such sulfur-containing compounds have boiling points spanning a broad range, resulting in distributions of some of them in the process gas stream, some in the heavy pygas stream, and some in the gas oil stream, and some in the steam cracker tar stream, upon quenching and separation of the steam cracker effluent. The presence and varied distributions of them pose significant challenges to the traditional product recovery and processing sections. We have found, e.g., (i) during the process for recovering various products, e.g., C2-C4 olefin products, from the process gas stream, (a) measures may be taken in the amine tower and/or the caustic wash tower to abate increased levels of methyl mercaptan, ethyl mercaptan, $CS_2$, and COS, in addition to $H_2S$ and $CO_2$, and (b) a sorbent bed may be used to abate COS from a hydrocarbon stream before any acetylene converter; (ii) in processing the pygas from the process gas stream and/or the heavy pygas stream, elevated levels of $CS_2$, dimethyl sulfide, and thiophenes can be addressed by using hydrogenation and/or hydrodesulfurization, in order to produce various end products with acceptable levels of such sulfur-containing compounds.

In certain aspects, the invention relates to a steam cracking process. A hydrocarbon feed is provided, wherein (i) the hydrocarbon feed comprises hydrocarbon and sulfur, and (ii) the hydrocarbon feed has a first sulfur content. At least one steam cracking furnace is provided, wherein the steam cracking furnace is integrated with a flash separation vessel. The hydrocarbon feed is introduced into the steam cracking to produce a steam cracker effluent having a second sulfur content that is less than the first sulfur content. A sulfur-enriched stream is removed from the flash separation vessel. The steam cracker effluent is introduced into at least one recovery facility to produce a process gas stream having a third sulfur content, the third sulfur content being less than the second sulfur content.

In other aspects, a hydrocarbon feed is provided, the hydrocarbon feed having a first sulfur content. Following optional desalting, the hydrocarbon feed or the desalted hydrocarbon feed (as the case may be) is preheated to produce a preheated feed. The preheated feed is combined with steam to produce a steam cracking feed. A primarily vapor-phase pyrolysis feed is separated from the steam cracking feed, wherein ≥20% of the hydrocarbon feed's sulfur (weight basis) resides in the pyrolysis feed. The pyrolysis feed is pyrolysed under pyrolysis conditions to produce a steam cracker effluent. SCT and an upgraded steam cracker effluent are separated from the steam cracker effluent, wherein ≥25% of the pyrolysis feed's sulfur resides in the steam cracker tar. A primarily liquid-phase pygas and a primarily vapor-phase process gas stream are separated from the upgraded steam cracker effluent, wherein ≥0.5% of the pyrolysis feed's sulfur (weight basis) resides in the pygas.

The invention also relates to systems and apparatus for carrying out any of the foregoing aspects.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate typical implementations of this disclosure, and are therefore not to be considered limiting of scope, for the disclosure may admit to other equally-effective implementations.

Figure 1:
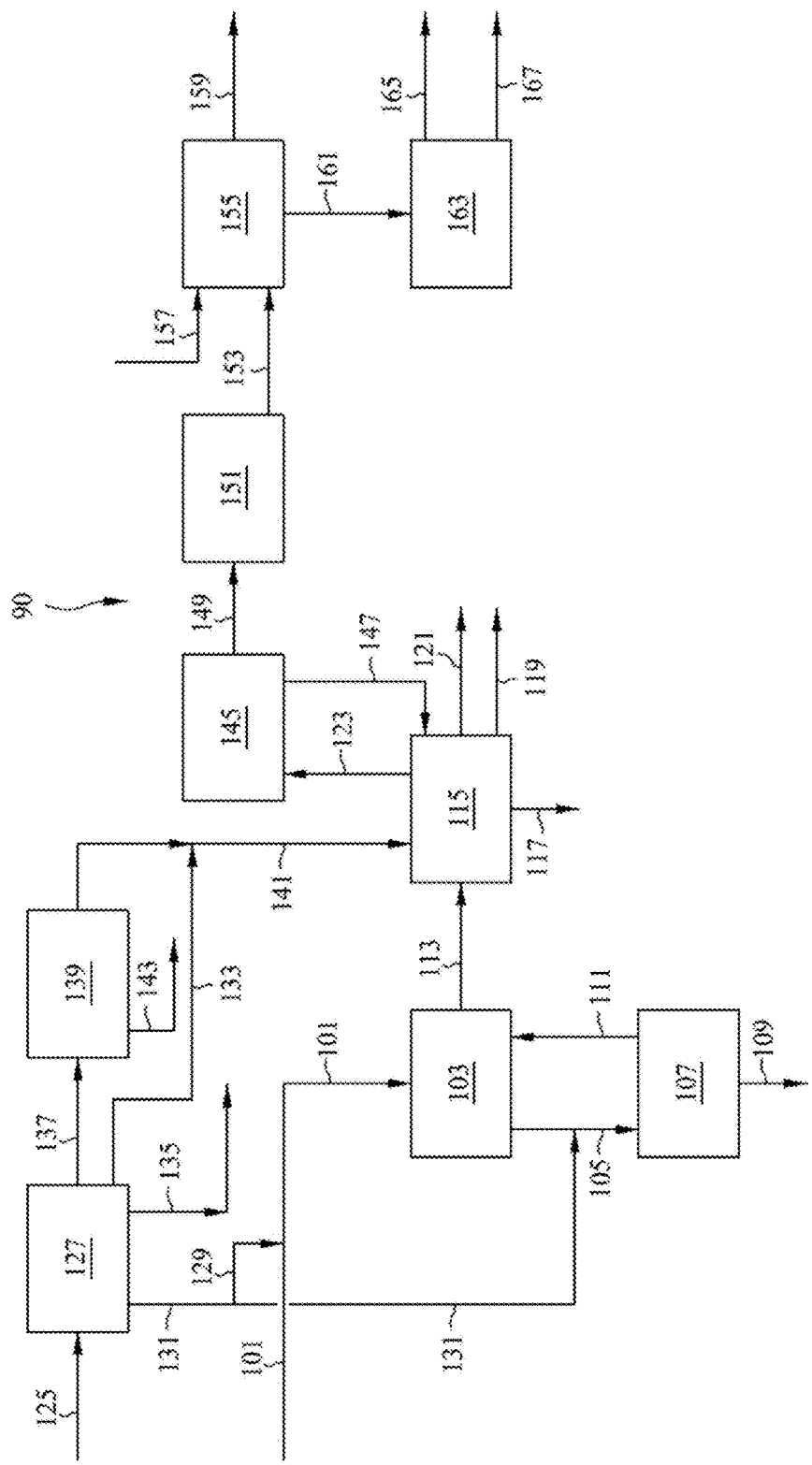
FIG. 1 is a flow diagram of an embodiment of steam cracking and fractionating a hydrocarbon feed.

To facilitate understanding, identical reference numerals have been used, where possible, to designate elements of similar functionality that are common to the Drawings. It is contemplated that elements and features of one implementation may be beneficially incorporated in other implementations without further recitation.

DETAILED DESCRIPTION

This disclosure relates to methods, processes, apparatus, and systems for steam cracking sulfur-containing hydrocarbon feeds. The sulfur can be in various forms, e.g., as elemental sulfur, one or more sulfur-containing compounds, etc. The management of feed sulfur allows for more cost effective processing within the operating requirements of steam crackers and products that meet specifications.

Certain aspects of the invention are carried out in a steam cracker plant comprising a furnace facility and a recovery facility. The furnace facility typically includes at least one desalter and at least one steam cracking furnace. The steam cracking furnace typically includes a convection section, a radiant section, and a vapor-liquid separator integrated with the convection section. Various products and co-products are recovered from the steam cracker effluent in a recovery facility located downstream of the steam cracking facility. The recovery facility can include one or more vessels (e.g., a flash drum, such as a tar-knock-out drum), for separating from the steam cracker effluent SCT and an upgraded steam cracker effluent. A primary fractionator is typically used for separating quench oil, gas oil, etc. from the upgraded steam cracker effluent. A vapor stream conducted away from the primary fractionator overhead is typically quenched in at least one vessel (e.g., a quench tower) for recovery of naphtha, water, and a process gas stream. Optionally, the primary fractionator can be combined with the quench tower. Additional product separation and recovery equipment is typically used, e.g., for recovering ethylene and/or propylene.

For the purpose of this description and appended claims, the following terms are defined.

Definitions

"Hydrocarbon" means a class of compounds containing hydrogen bound to carbon. The term "$C_n$" hydrocarbon means hydrocarbon having n carbon atom(s) per molecule, where n is a positive integer. The term "$C_{n+}$" hydrocarbon means hydrocarbon having at least n carbon atom(s) per molecule, where n is a positive integer. The term "$C_{n-}$" hydrocarbon means hydrocarbon having no more than n number of carbon atom(s) per molecule, where n is a positive integer. "Hydrocarbon" encompasses (i) saturated hydrocarbon, (ii) unsaturated hydrocarbon, and (iii) mixtures of hydrocarbons, including mixtures of hydrocarbon compounds (saturated and/or unsaturated), including mixtures of hydrocarbon compounds having different values of n. The term "unsaturate" or "unsaturated hydrocarbon" means a $C_{2+}$ hydrocarbon containing at least one carbon atom directly bound to another carbon atom by a double or triple bond. The term "olefin" means an unsaturated hydrocarbon containing at least one carbon atom directly bound to another carbon atom by a double bond. In other words, an olefin is a compound which contains at least one pair of carbon atoms, where the first and second carbon atoms of the pair are directly linked by a double bond. "Light olefin" means $C_{5-}$ olefinic hydrocarbon.

"Heavy hydrocarbon" means a mixture comprising hydrocarbon, the mixture having an API gravity in the range of from 5° up to (but not including) 22°. "Medium hydrocarbon" means a mixture comprising hydrocarbon, the mixture having an API gravity in the range of from 22° to 30°. A "relatively-heavy" hydrocarbon has an API gravity that is less than that of naphtha.

In this disclosure, "alkyn" means a compound having a carbon-carbon triple bond in its molecule structure. An "alkyn converter" or "acetylene converter" interchangeably means a reactor unit which receives a feed comprising an olefin, an alkyn, and molecular hydrogen, allows the alkyn and molecular hydrogen to contact a converting catalyst disposed in the reactor to convert at least a portion of the alkyn to the olefin to produce a converted effluent having a reduced amount of the alkyn compared to the feed. "Thiophenes" means thiophene

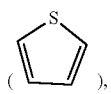

any compound having a thiophene ring structure with one or more hydrogen atoms therein replaced by one or more other atom(s), and any mixture thereof. "Methyl mercaptan" means $CH_3$—SH. "Ethyl mercaptan" means $C_2H_5$—SH. "dimethyl sulfide" means $CH_3$—S—$CH_3$.

In connection with hydrocarbon, the term "sour" means a hydrocarbon e.g., a crude oil, comprising ≥0.5 wt. % of sulfur based on the weight of the hydrocarbon, where the weight percent encompasses all forms of sulfur in the hydrocarbon, e.g., one or more of elemental sulfur, sulfur bound in compounds, sulfur bound to, entangled with, or associated with aggregates such as asphaltenes and tar heavies, etc. Unless otherwise indicated, the amount of a particular sulfur-containing molecule (or sulfur-containing compound) in a particular composition (e.g., the amount of methyl mercaptan in a process gas stream) is expressed in weight percent, based on the total weight of that composition.

"Primarily liquid phase" means a composition of which ≥50 wt. % is in the liquid phase, e.g., ≥75 wt. %, such as ≥90 wt. %. A hydrocarbon feed is primarily liquid-phase when ≥50 wt. % of the hydrocarbon feedstock is in the liquid phase at a temperature of 25° C. and a pressure of 1 bar absolute, e.g., ≥75 wt. %, such as ≥90 wt. %.

"Raw" feedstock, e.g., raw hydrocarbon feedstock, means a primarily liquid-phase feedstock that comprises ≥25 wt. % of crude oil that has not been subjected to prior desalting and/or to prior fractionation with reflux, e.g., ≥50 wt. %, such as ≥75 wt. %, or ≥90 wt. %.

"Crude oil" means a mixture comprising naturally-occurring hydrocarbon of geological origin, where the mixture (i) comprises ≥1 wt. % of resid, e.g., ≥5 wt. %, such as ≥10 wt. %, and (ii) has an API gravity ≤52°, e.g., ≤30°, such as ≤20°, or ≤10°, or ≤8°. The crude oil can be classified by API gravity, e.g., heavy crude oil has an API gravity in the range of from 5° up to (but not including) 22°. Likewise, a medium crude oil has an API gravity in the range of from 22° to 30°.

Normal boiling point and normal boiling point ranges can be measured by gas chromatograph distillation according to the methods described in ASTM D-6352-98 or D2887, as extended by extrapolation for materials above 700° C. The term "$T_{50}$" means a temperature, determined according to a boiling point distribution, at which 50 weight percent of a particular sample has reached its boiling point. Likewise, "$T_{90}$", "$T_{95}$" and "$T_{98}$" mean the temperature at which 90, 95, or 98 weight percent of a particular sample has reached its boiling point. Nominal final boiling point means the temperature at which 99.5 weight percent of a particular sample has reached its boiling point.

Certain medium and/or heavy hydrocarbons, e.g., certain raw hydrocarbon feedstocks, such as certain crude oils and crude oil mixtures, contain one or more of asphaltenes, precursors of asphaltenes, and particulates. Asphaltenes are described in U.S. Pat. No. 5,871,634, which is incorporated herein by reference in its entirety. Asphaltene content can be determined using ASTM D6560-17. "Resid" means an oleaginous mixture, typically contained in or derived from crude oil, the mixture having a normal boiling point range ≥1050° F. (566° C.). Resid can include "non-volatile components", meaning compositions (organic and/or inorganic) having a normal boiling point range ≥590° C. Certain non-volatile components have a normal boiling ≥760° C.

A "steam cracker" or "steam cracking furnace" is a form of thermal pyrolysis apparatus having at least a convection section and a radiant section. Heat for the furnace is provided by burners located in the radiant section. The burners combust fuel and air, and produce a flow of combustion effluent. The combustion effluent flows out of the radiant section, through the convection section, and is then conducted away from the steam cracking furnace. The convection section includes at least one tubular member (a "convection coil"). Likewise, the radiant section also includes at least one tubular member (a "radiant coil"). The outer surface of the radiant coil is heated at least by radiant heat from the burners. The outer surface of the convection coil is heated at least by combustion effluent traversing the convection section. The downstream end of the convection coil is in fluidic communication with the upstream end of the radiant coil via crossover piping. At least one vapor-liquid separator is typically integrated with the convection section, e.g., in fluidic communication with the convection coil. A feed comprising hydrocarbon and sulfur (a "hydrocarbon feed") is introduced into the convection coil for preheating, typically after desalting. Steam is added to the preheated hydrocarbon feed to produce a steam cracking feed. Steam may be added for a variety of reasons, such as to reduce hydrocarbon partial pressure, to control residence time, and/or to decrease coke formation. The steam may be superheated, such as in the convection section of the furnace, and/or the steam may be sour or treated process steam. An optional vapor-liquid separator can be used to separate from the steam cracking feed a primarily vapor-phase pyrolysis feed and a primarily liquid bottoms stream. The pyrolysis feed is conducted into the radiant coil, typically via crossover piping, and optionally after heating in one or more additional convection coils. A steam cracker effluent is conducted away from the radiant coil outlet. To lessen the amount of over-cracking and other undesired side-reactions, the steam cracker effluent is rapidly cooled ("quenched"), e.g., by indirect cooling in one or more heat exchangers (such as one or more transfer line exchangers) and/or direct cooling by injecting of a quench fluid, e.g., one or more of an oleaginous quench fluid such as quench oil, liquid water, and steam.

The term "steam cracker tar" ("SCT") means (a) a mixture of hydrocarbons having one or more aromatic components and optionally (b) non-aromatic and/or non-hydrocarbon molecules, the mixture being derived from hydrocarbon pyrolysis and having a $T_{90} \geq 290°$ C., e.g., $\geq 500°$ C., such as $\geq 600°$ C., or greater. In certain aspects, SCT is separated from quench (or partially quenched) steam cracker effluent in a separation vessel such as tar knock-out drum, primary fractionator, etc. SCT can include hydrocarbon molecules (including mixtures and aggregates thereof) having (i) one or more aromatic components and (ii) a molecular weight of about $C_{15}$ or greater of about 50 wt. % or greater (e.g., 75 wt. % or greater, such as 90 wt. % or greater), based on the weight of the SCT.

The addition of steam at various points in the process is not detailed in every embodiment described. It is further noted that any of the steam added may include sour or treated process steam and that any of the steam added, whether sour or not, may be superheated. For example, superheating the stream can be performed when the steam comes from sour water.

In certain aspects of the invention the hydrocarbon feed comprises (i) sulfur and (ii) a heavy and/or medium hydrocarbon. These aspects will now be described in more detail. The invention is not limited to these aspects, and this description is not meant to exclude other aspects within the broader scope of the invention, such as those in which the hydrocarbon feed is a medium hydrocarbon.

Hydrocarbon Feed

In certain aspects, the hydrocarbon feed comprises sulfur and hydrocarbon. Those skilled in the art will appreciate that the term "hydrocarbon feed" is a label and does not mean that the feed contains hydrocarbon only. Although at least a portion of the sulfur can be added to the hydrocarbon feed, it is typical for most or even all of the sulfur to be present in the feed at the feed's source. For example, the sulfur in the hydrocarbon feed can be sulfur that is naturally present in certain heavy hydrocarbons such as sulfur that is naturally present in crude oil. In these and other aspects, the hydrocarbon can have a nominal final boiling point of about 315° C. or greater, such as about 400° C. or greater, about 450° C. or greater, or about 500° C. or greater.

In certain aspects, the feed's hydrocarbon can be relatively-high molecular weight hydrocarbon, e.g., a heavy hydrocarbon, such as those which pyrolyse to produce a relatively large amount of steam cracker naphtha (also called pyrolysis gasoline), steam cracker gas oil ("SCGO"), and SCT during steam cracking. The heavy hydrocarbon may include one or more of resids (also called residual oil or residues), gas oils, heating oil, jet fuel, diesel, kerosene, coker naphtha, hydrocrackate, reformate, raffinate reformate, distillate, crude oil, atmospheric pipestill bottoms, vacuum pipestill streams including bottoms, condensates, heavy non-virgin hydrocarbon streams from refineries, vacuum gas oils, heavy gas oil, naphtha contaminated with crude, atmospheric residue, heavy residue, $C_4$/residue admixture, naphtha residue admixture, gas oil residue admixture, low sulfur waxy residue, atmospheric residue, and heavy residue.

In certain aspects, the hydrocarbon feed includes economically-advantaged, minimally-processed heavy hydrocarbon containing non-volatile components and coke precursors. For example, the hydrocarbon feed can include about 1 wt. % or more of heavy hydrocarbon, based on the weight of the hydrocarbon feed, such as about 25 wt. % or more, about 50 wt. % or more, about 75 wt. % or more, about 90 wt. % or more, or about 99 wt. % or more. The hydrocarbon feed can comprise, consist of, or consist essentially of one or more raw feeds, such as one or more crude oils.

In certain aspects, the hydrocarbon feed further comprises relatively-low molecular weight hydrocarbon (e.g., medium and/or light hydrocarbon). Light hydrocarbon typically includes naphtha boiling-range hydrocarbon and substantially saturated hydrocarbon molecules having fewer than five carbon atoms, e.g., ethane, propane, and mixtures thereof. Although hydrocarbon feedstocks comprising light hydrocarbon typically produce a greater yield of $C_2$ unsaturates (ethylene and acetylene) than do those comprising heavy hydrocarbon, heavy hydrocarbon is of increasing interest due to lower costs and higher availability.

Besides hydrocarbon, the hydrocarbon feed also includes sulfur, e.g., sulfur in the form of elemental sulfur, one or more inorganic sulfur compounds, one or more organic sulfur compounds, sulfur associated with aggregates such as asphaltenes, and mixtures thereof. Typical sulfur compounds that may be present in the hydrocarbon feed include hydrogen sulfide ($H_2S$), Methyl Mercaptan ("MM"), Ethyl Mercaptan ("EM"), Carbonyl Sulfide ("COS"), Carbon Disulfide ("$CS_2$"), Dimethyl Sulfide ("DMS"), one or more $C_{3+}$ mercaptans, one or more thiophenes, or any combination thereof.

The sulfur content of the hydrocarbon feed (the "first sulfur content") can be measured according to ASTM D1552. The first sulfur content can be about 5 wt. % or less, and for sour hydrocarbon feeds about 0.5% or greater, based on the weight of the hydrocarbon feed. For example the first sulfur content may be from about 0.5 wt. % to about 5 wt. %, from about 1 wt. % to about 4 wt. %, from about 2 wt. % to about 4 wt. %, or from about 3 wt. % to about 4 wt. %. The processes and systems of this disclosure are particularly advantageous for steam cracking of a hydrocarbon feed having a high first sulfur content ranging from, c1 to c2 wt %, based on the total weight of the hydrocarbon feed, wherein c1 and c2 can be, independently, e.g., 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.4, 2.5, 2.6, 2.8, 3.0, 3.2, 3.4, 3.5, 3.6, 3.8, 4.0, 4.2, 4.4, 4.5, 4.6, 4.8, 5.0, as long as c1<c2. While the processes and systems of this disclosure may be used for steam cracking of a hydrocarbon feed comprising relatively low sulfur content of less than 700 ppm by weight such as an ethane stream, a propane stream, a naphtha stream, and the like, more preferably they are used for steam cracking of those hydrocarbon feeds having high sulfur content such as those described above, e.g., a crude, a vacuum gas oil stream, a gas oil stream, and mixtures thereof.

Steam Cracker

Certain aspects of the invention will now be described in more detail with reference to FIG. 1. These aspects include processing a hydrocarbon feed comprising sulfur and heavy hydrocarbon in a steam cracking plant having a furnace facility and a recovery facility. The invention is not limited to these aspects, and this description is not meant to foreclose other aspects within the broader scope of the invention, such as those in which the hydrocarbon feed is a desalted feed, those in which the hydrocarbon feed comprises a different hydrocarbon, and/or those in which the furnace and recovery facilities are in different locations.

FIG. 1 depicts a partial schematic view of a process and system 90 which is used to produce light olefins while decreasing or even eliminating sulfur in various streams as may be derived and/or produced from hydrocarbon feed 101. As shown, hydrocarbon feed first enters steam cracking furnace 103 via line 101 into the steam cracking furnace's convection section, an upper portion (not separately shown) of the steam cracking furnace 103. The hydrocarbon feed is preheated in at least one convection coil located in the convection section by an indirect transfer of heat to the hydrocarbon feed from the furnace's combustion effluent (mainly flue gases). The resulting preheated hydrocarbon feed is conducted out of steam cracking furnace 103 via line 105. Steam is introduced via line 131 into the preheated hydrocarbon feed to produce a steam cracking feed. A primarily vapor-phase pyrolysis feed and a primarily liquid-phase bottoms stream are separated from the steam cracker feed in flash separation vessel 107. The primarily liquid-phase bottoms stream comprises various forms of sulfur and non-boiling hydrocarbon, and is sent away via line 109. The pyrolysis feed is returned to the steam cracking furnace 103 via crossover piping 111. The pyrolysis feed is introduced into an inlet of at least one radiant coil, and is conducted through the radiant section (lower portion of the furnace, not shown) of steam cracking furnace 103 for pyrolysis (cracking). The pyrolysis produces a steam cracker effluent that is transferred via line 113 for further processing, e.g., quenching and then purification and recovery of from the quenched steam cracker effluent of various products and co-products in the steam cracking plant's recovery facility.

The invention will now be described in more detail with reference to a representative convection section, a representative flash separator, and a representative radiant section. The invention is not limited to these representative components of a steam cracking furnace, and this description should not be interpreted as foreclosing other forms of steam cracking furnace within the broader scope of the invention, such as those that do not have a flash separator integrated with the convection section.

Convection Section

The hydrocarbon feed is introduced for preheating into an inlet of at least one convection coil located in the steam cracking furnace's convection section. The preheating of the hydrocarbon feed may include indirect contact of the feed in the convection section of the steam cracker with hot flue gases traveling upward from the radiant section of the furnace. Typically, the hydrocarbon feed is divided among a plurality of convection coils. These can have the form of a bank of heat exchange tubes located within the convection section of the steam cracker. The preheated hydrocarbon feed may have a temperature in a range of from about 150° C. to about 260° C., such as about 160° C. to about 230° C., or about 170° C. to about 220° C.

The steam cracking feed can also be pre-heated, typically upstream of flash separation vessel 107. Typically, the amount of steam in the steam cracking feed is ≥5 wt. % based on the weight of the steam cracking feed, e.g., in a range of from about 10 wt. % to about 90 wt. %. Typically ≥90 wt. % of the remainder of the steam cracking feed is the preheated hydrocarbon feed, e.g., ≥95 wt. %, such as ≥99 wt. %. In certain aspects, the steam cracking feed has a weight ratio of steam to hydrocarbon feed in the range of from about 0.1 to about 1, such as about 0.2 to about 0.6.

Flash Separator

The flash separator separates from the steam cracking feed at least (i) a primarily vapor-phase pyrolysis feed and (ii) a primarily liquid-phase bottoms stream vapor phase. The flash separator can include one or more conventional flash separation vessels, e.g., one or more flash pots, flash drums, etc., but the invention is not limited thereto. Although they are applicable in other aspects, such flash separation vessels are particularly suitable when the preheated hydrocarbon feed includes about 0.1 wt. % or more of asphaltenes based on the weight of the preheated hydrocarbon feed, e.g., about 5 wt. % or more. Examples of suitable flash separation vessels and configurations for integrating these with a steam cracking furnace are disclosed in U.S. Pat. Nos. 6,632,351; 7,138,047; 7,090,765; 7,097,758; 7,820,035; 7,311,746; 7,220,887; 7,244,871; 7,235,705; 7,247,765; 7,351,872; 7,297,833; 7,488,459; 7,312,371; and 7,578,929; each of which being incorporated by reference herein.

Referring again to FIG. 1, the flash separation carried out in vessel 107 typically results in transferring to the bottoms stream at least a portion of steam cracking feed's sulfur (in various forms) and at least a portion of the steam cracking feed's high molecular-weight molecules, such as asphaltenes. The sulfur-rich bottoms stream is conducted away from vessel 107 via line 109. The bottoms stream may include, for example, (i) at least about 25 wt. % of the preheated hydrocarbon feed's total sulfur content (all forms of sulfur), and (ii) at least about 10 wt. % of asphaltenes in the preheated hydrocarbon feed. Typically, ≥30 wt. % of the preheated hydrocarbon feed's total sulfur content (all forms of sulfur) resides in the bottoms stream, e.g., ≥35 wt. %, such as ≥40 wt. %, or ≥45 wt. %. The sulfur-lean, primarily vapor-phase pyrolysis feed is conducted to the radiant section via crossover piping 111. Optionally, the pyrolysis feed can be subjected to further heating in the convection section before it is introduced into the crossover piping.

It has been found that utilizing the specified flash separation vessel increases the breadth of hydrocarbon feeds that can be introduced into the steam cracking furnace via line 101 with little if any pretreatment. For example, integrating a flash separation vessel with the steam cracking furnace's convection section has been found to facilitate the steam cracking of a wide range of hydrocarbon feeds, including those comprising ≥50 wt. % of one or more of medium hydrocarbon, heavy hydrocarbon, raw heavy hydrocarbon, raw medium hydrocarbon, desalted heavy hydrocarbon and/or desalted medium hydrocarbon, heavy and/or medium crude oil, desalted heavy crude oil and/or desalted medium crude oil, etc., such as ≥75 wt. %, or ≥90 wt. %, based on the weight of the hydrocarbon feed.

It also has been found that utilizing the specified flash separation vessel results in improved management of undesired contaminants in the steam cracking feed because vapor-phase contaminants (e.g., those transferred to the pyrolysis feed) may be kept within predetermined limits. In certain aspects, utilizing the specified flash separation vessel advantageously transfers to the bottoms stream ≥50 wt. % of any salts and particulates in the liquid-phase portion of the steam cracking feed, e.g., ≥75 wt. %, such as ≥90 wt. %, or ≥99 wt. %. The composition of the hydrocarbon feed conducted to the steam cracking furnace, the amount of the hydrocarbon feed conducted to the furnace, the amount of preheating of the hydrocarbon feed, the amount of dilution steam combined with the preheated hydrocarbon feed, and the amount of any heating of the steam cracking feed upstream of the separation vessel are typically selected to achieve a vaporization of ≥2 wt. % of the hydrocarbon portion of the steam cracking feed at the location where the steam cracking feed enters the separation vessel, e.g., ≥5 wt. %, such as ≥10 wt. %, or ≥20 wt. %, or ≥50 wt. %, or ≥75 wt. %, or ≥90 wt. %, or ≥95 wt. % or more. For example, these selections can be made to achieve a vaporization of the hydrocarbon portion of the steam cracking feed in a range of about 5 wt. % to about 98 wt. %, e.g., about 10 wt. % to about 95 wt. %, such as about 20 wt. % to about 80 wt. %, or about 25 wt. % to about 75 wt. %. Typically, ≥75 wt. % of the remainder of the hydrocarbon portion of the steam cracking feed (the portion that is not in the vapor phase) is in the liquid phase, e.g., ≥90 wt. %, or ≥95 wt. %.

Likewise, it has been found that salts and particulates as may be present in the steam cracking feed are more efficiently transferred to the bottoms stream in the flash separation vessel when a sufficient flow velocity, particularly a sufficient flow velocity of the liquid-phase portion of the steam cracking feed, is maintained in the convection section (e.g., in the convection coils) upstream of the flash separation vessel. It is observed that doing so results in maintaining the salts and/or particulate matter in suspension, leading to an increase in the amount of these species transferred to the bottoms stream. The composition (and hence properties such as viscosity and API gravity) of the hydrocarbon portion of the steam cracking feed, the flow velocity of the steam cracking feed (particularly the flow velocity of the liquid portion of the steam cracking feed), and the type and amounts of salts and/or particulate matter in these flows can be selected to achieve a predetermined liquid-phase amount of the steam cracking feed. For feeds exhibiting a lesser flow velocity, particularly a lesser flow velocity of the liquid-phase portion, a greater amount of the steam cracking feed in the liquid-phase is indicated. This is typically the case when the hydrocarbon feed comprises a more viscous, generally heavier, hydrocarbon. It is generally desirable to select these properties and conditions to maintain about 2% or greater of the hydrocarbon portion of the steam cracking feed in the liquid phase at the location where the steam cracking feed enters the separation vessel, such as about 5% or greater, on a weight basis. Doing so has been found to increase the amount of salts and/or particulate matter maintained in suspension.

The flash separation vessel may operate at a temperature from about 315° C. to about 510° C. and/or a pressure from about 275 kPa to about 1400 kPa, such as, a temperature from about 430° C. to about 480° C., and/or a pressure from about 700 kPa to about 760 kPa.

In certain aspects, one or more of the hydrocarbon feed's composition, the preheating conditions, the steam quality and amount, and the steam cracker feed separation conditions are selected to transfer to the bottoms stream ≥25 wt. % of the sulfur in the hydrocarbon feed, e.g., ≥50 wt. %, such as ≥60 wt. %, or in the range of from 50 wt. % to 80 wt. %; with ≥90 wt. % of the remainder of the hydrocarbon feed's sulfur residing in the pyrolysis feed, e.g., ≥95 wt. %, such as ≥99 wt. %. In other aspects, ≥20 wt. % of the hydrocarbon in the hydrocarbon feed is transferred to the pyrolysis feed, e.g., ≥25 wt. %, such as ≥50 wt. %, or ≥60 wt. %, or in the range of from 50 wt. % to 80 wt. %; with ≥90 wt. % of the remainder of the hydrocarbon feed's hydrocarbon residing in the bottoms stream, e.g., ≥95 wt. %, such as ≥99 wt. %. For example, the amount of hydrocarbon feed's sulfur (weight basis, all forms of sulfur in the hydrocarbon feed) residing in the pyrolysis feed can be ≥75%, such as ≥90%, or in a range of from 20 wt. % to 95 wt. %, e.g., 20 wt. % to 90 wt. %, such as 25 wt. % to 75 wt. %. Depending on the composition of the hydrocarbon feed and the conditions utilized in the convection section and flash separation vessel, the various forms of sulfur present in the pyrolysis feed might differ from those of the hydrocarbon feed. The bottoms stream can be conducted away from the flash separation vessel, e.g., for storage and/or further processing, and the pyrolysis feed is conducted to the steam cracking furnace's radiant section. The sulfur contents of these streams will now be described in more detail.

The pyrolysis feed has a sulfur content (the "second" sulfur content"), which can be measured as a weight percent, e.g., according to ASTM D1552, and is based on the weight of the pyrolysis feed. The second sulfur content ("Sulfcon$_2$") is less than the first sulfur content (the sulfur content of the hydrocarbon feed, "Sulfcon$_1$"). For example, Sulfcon$_2$ can be expressed as a factor F times Sulfcon$_1$ (Sulfcon$_2$=F*Sulfcon$_1$), where (i) F is in a range of from F$_1$ to F$_2$; (ii) F, F$_1$, and F$_2$ are positive real numbers, and (iii) F$_1$<F$_2$. Typically, F$_1$ is in a range of from 0.30 to about 0.90, and F$_2$ is in a range of about 0.90 to about 0.99. More specifically, F$_1$ can be one of 0.30, 0.35, 0.45, 0.50, 0.55, 0.60, 0.65, 0.70, 0.75, 0.80, 0.85, and 0.90; F$_2$ can be one of 0.99, 0.95, 0.90, 0.85, 0.80, 0.75, 0.70, and 0.65; and F can be one of 0.30, 0.35, 0.45, 0.50, 0.55, 0.60, 0.65, 0.70, 0.75, 0.80, 0.85, 0.90, 0.95, and 0.99 wt. % of the first sulfur content. Those skilled in the art will appreciate that the amount of sulfur (in all forms of sulfur) in the flash separator's bottoms stream (e.g., via line 109) can be predetermined, mainly from (i) the initial amounts of the individual forms of sulfur in the hydrocarbon feed, and (ii) process conditions selected for the steam cracking furnace's convection section and flash separation vessel (e.g., temperature, pressure, flow rates, etc.).

In certain aspects, the Sulfcon$_2$ is ≤1.5 wt. %. Sulfur compounds typically found in the pyrolysis feed include H$_2$S, MM, EM, COS, CS$_2$, or C$_{2+}$ mercaptans, and thiophenes. A majority of sulfur in the pyrolysis feed can be bound as C$_{2+}$ mercaptans and thiophenes. For example, of total amount of sulfur (in any form) present in the pyrolysis feed, ≥50 wt. % can be in the form of C$_{2+}$ mercaptans and thiophenes, such as ≥60 wt. %, or ≥70 wt. %, or ≥80 wt. %, or ≥90 wt. %, or ≥99 wt. %, or more, based on the total weight of sulfur (in any form) in the pyrolysis feed. The combined amount of C$_{2+}$ mercaptans and thiophenes in the pyrolysis feed may be in the range of from about 500 wppm to about 3000 wppm, or from about 2500 wppm to about 2900 wppm. Some forms of sulfur have a molecular weight that is less than of ethyl mercaptan (low molecular weight sulfur forms, or "LMW sulfur". Examples of LMW sulfur include carbonyl sulfide, methyl mercaptan, and hydrogen sulfide. In some embodiments the molar ratio of C$_{2+}$ sulfur compounds to LMW sulfur compounds in the pyrolysis feed is about 10:1 or greater, about 100:1 or greater, about 1000:1 or greater, or about 10,000:1 or greater.

Radiant Section

The pyrolysis feed is pyrolysed under pyrolysis conditions in a plurality of furnace tubes to produce the steam cracker effluent. The furnace tubes (radiant tubes or radiant coil) are located in the radiant section of the furnace. Heat for the pyrolysis is mainly provided by burners. The burners are positioned in a firebox within the radiant section to provide radiant heating to the outer surface of the furnace tubes. The burners are typically located in or proximate to the floor of the firebox. Turning again to FIG. 1, pyrolysis feed via line 111 is introduced into at least one radiant coil located in the radiant section (bottom portion) of steam cracker 103, where hydrocarbon and certain sulfur-containing species in the pyrolysis feed are pyrolysed to produce a steam cracker effluent. The steam cracker effluent comprises hydrocarbon, including $C_{2+}$ olefin, and a new assortment of sulfur-containing compositions. In other words, the pyrolysis converts least some of the forms of sulfur present in the pyrolysis feed to different forms of sulfur in the steam cracker effluent. The steam cracker effluent is conducted away from the radiant section via line 113. The amount of the pyrolysis feed that is in the vapor phase at the inlet of the radiant coils is typically about 90 wt. % or greater, such as about 95 wt. % or greater, or about 99 wt. % or greater.

Those skilled in the art will appreciate that a wide range of pyrolysis conditions can be used, and that the selection of particular pyrolysis conditions will depend, e.g., on the composition of the selected hydrocarbon feed and the relative amounts of the various products and co-products in the steam cracker effluent, e.g., the relative amounts of ethylene and propylene. For example, the pyrolysis conditions typically include heating the pyrolysis feed in a radiant coil to achieve a temperature of the radiant coil effluent (measured at the outlet of the radiant coil) of about 400° C. or greater, such as from about 400° C. to about 1100° C., a pressure (as measured at the radiant coil outlet) of about 10 kPa or greater, and a residence time in the radiant coil of from about 0.01 second to 5 seconds. In certain aspects, e.g., those in which the hydrocarbon feed includes crude oil or desalted crude oil, pyrolysis conditions can include one or more of (i) a temperature of about 760° C. or greater, such as from about 760° C. to about 1100° C., or from about 790° C. to about 880° C., (ii) a pressure of about 50 kPa or greater, such from about 60 kPa to about 500 kPa, or from about 90 kPa to about 240 kPa; and/or (iii) a residence time from about 0.1 seconds to about 2 seconds. For hydrocarbon feeds containing lighter hydrocarbon, it is typical to utilize a temperature in the range of from about 760° C. to about 950° C. The specified steam cracking conditions may be sufficient to convert by pyrolysis at least a portion of the pyrolysis feed's hydrocarbon molecules to $C_{2+}$ olefins and a portion of the pyrolysis feed's sulfur to forms of lesser molecular weight.

The steam cracker effluent generally includes unconverted constituents of the pyrolysis feed and pyrolysis products. The pyrolysis products generally include $C_{2+}$ olefin, molecular hydrogen, acetylene, aromatic hydrocarbon, saturated hydrocarbon, $C_{3+}$ diolefins, aldehyde, $CO_2$, steam cracker tar, and various forms of sulfur. Sulfur in the steam cracker effluent is typically present in the form of (i) sulfur bound to or in association with relatively large molecular weight aggregates, such as those typically found in SCT, and (ii) compounds including one or more of $H_2S$, COS, $CS_2$, DMS, thiophenes and/or mercaptans. Various constituents of the steam cracker effluent may be categorized as (i) those that would be primarily vapor-phase at a temperature of 25° C. and a pressure of 1 bar (absolute), such as one or more of acetylene, ethylene, propylene, butenes, $H_2S$, MM, COS, and (ii) those that would be primarily liquid-phase under those conditions, including, e.g., one or more of $C_{5+}$ molecules, thiophenes, DMS, $C_{2+}$ mercaptans and mixtures thereof. Under those conditions, some sulfur compounds may partition between the vapor phase and the liquid phase. For example, separating ethyl mercaptan from the steam cracker effluent in a vapor-liquid in a conventional separation at 25° C. and a pressure of 1 bar (abs) would separate about 80% of ethyl mercaptan with the vapor phase and about 20% with the liquid phase.

The pyrolysis typically converts at least a portion of pyrolysis feed's sulfur to sulfur forms of lesser molecular weight. For example, the ratio of $C_{2+}$ sulfur compounds to LMW sulfur compounds in the steam cracker effluent may be less than the ratio of $C_{2+}$ sulfur compounds to LMW sulfur compounds in the pyrolysis feed. In certain aspects, the molar ratio of $C_{2+}$ to LMW sulfur compounds in the pyrolysis feed may be about 1000:1 or greater, about 100:1 or greater, or about 10:1 or greater, and/or the ratio of $C_{2+}$ to LMW sulfur compounds in the steam cracker effluent may be about 1:10 or less, about 1:1 or less, or about 10:1 or less. The pyrolysis can increase the amount LMW sulfur compounds in the steam cracker effluent in comparison with the amount in the pyrolysis feed, e.g., an increase of ≥about 100 wppm, e.g., ≥about 500 wppm, such as ≥about 1000 wppm, or ≥about 1500 wppm, or in a range of from about 100 wppm to about 3000 wppm, or from about 500 wppm to about 2500 wppm, or from about 1000 wppm to about 2000 wppm.

The amount of LMW sulfur in the steam cracker effluent depends mainly on the amount of sulfur forms in the pyrolysis feed from which the LMW sulfur is derived. In some embodiments, the pyrolysis converts ≥about 30% of the pyrolysis feed's $C_{2+}$ sulfur compounds to LMW sulfur compounds, e.g., ≥about 40%, such as ≥about 50%, or ≥about 60%, or ≥about 70%. For example, if the pyrolysis feed contained about 3000 wppm of $C_{2+}$ sulfur compounds, the steam cracker effluent may contain ≥about 900 wppm of LMW sulfur compounds, or ≥about 1200 wppm, or ≥about 1500 wppm, or ≥about 1800 wppm, or ≥about 2100 wppm, such as in a range of from about 900 wppm to about 2500 wppm, or from about 1200 wppm to 2200 wppm.

Without being limited by theory, the ease of removing lighter sulfur compounds (e.g. LMW sulfur compounds) from the steam cracker effluent may allow for a more efficient removal process than attempting to remove sulfur compounds from the hydrocarbon feed, the steam cracking feed, or the pyrolysis feed before the pyrolysis. This especially the case when the feed contains relatively refractory forms of sulfur, e.g., $C_{5+}$ mercaptan, and thiophenic sulfur. In those cases, the pyrolysis converts feed sulfur to forms that can be more easily removed from the effluent, e.g., $H_2S$ and $C_{4-}$ mercaptan.

The steam cracker effluent is a combination of useful products such as molecular hydrogen, $C_1$-$C_{10}$ hydrocarbon, steam cracker gas oil (mainly $C_{10}$-$C_{17}$ hydrocarbon), and SCT. SCT is a high-boiling point, viscous, reactive material that can be upgraded to a fuel oil, e.g., by blending and/or hydroprocessing, but can foul equipment under certain conditions. In general, pyrolysis feeds containing higher-boiling materials tend to produce greater quantities of SCT. The formation of SCT mainly occurs downstream of the radiant coil outlet. Quenching the steam cracker effluent can decrease the amount of SCT produced, e.g., by rapidly reducing the temperature of the steam cracker effluent at a location proximate to the radiant coil outlet to a value at which the tar-forming reactions are greatly slowed. The steam cracker effluent can be quenched by various methods such as contacting with cooled hydrocarbon, e.g., a direct quench with quench oil. Alternatively or in addition, the steam cracker effluent can be rapidly cooled in heat exchangers such as transfer line exchangers. Conventional quenching apparatus can be used, but the invention is not limited thereto.

Although one transfer line heat exchanger can be used, using two or more transfer line heat exchangers is within the scope of the invention. For example, the steam cracker effluent can be quenched by a rapid but indirect cooling against water and/or steam in two or more transfer line exchangers. Generally, the partially-quenched effluent leaving the first transfer line exchanger remains at a temperature above the dew point (the temperature at which the first drop of liquid condenses) of the steam cracked effluent. For a typical hydrocarbon feed containing heavy hydrocarbons and typical pyrolysis conditions, the hydrocarbon dew point of the steam cracker effluent may be from about 375° C. to about 650° C., such as from about 480° C. to about 600° C. Above the hydrocarbon dew point, the fouling tendency is relatively low, because vapor phase fouling is generally not severe, and there is little to no liquid present that could cause fouling.

Besides or in addition to quenching in one or more transfer line exchangers, the steam cracker effluent can be subjected to direct quench at a point between the steam cracker 103 and fractionation system 115. The direct quench is accomplished by contacting the steam cracker effluent with a liquid quench stream. Where employed in conjunction with at least one transfer line exchanger, the quench liquid may be introduced at a point downstream of the transfer line exchanger(s). Suitable quench liquids include liquid quench oil, such as one or more of SCT, hydroprocessed SCT, primary fractionator bottoms or side streams, pyrolysis fuel oil, and water, which can be obtained from various suitable sources, e.g., the condensed dilution steam.

At least a portion of the quenched steam cracker effluent is conducted away from the furnace facility to the steam cracking plant's recovery facility for separation and purification of various products and co-products. Certain aspects of a representative recovery facility will down be described in more detail with reference to FIG. 1. In these aspects, the recovery facility includes among its main components a fractionation system, a sour water stripping and dilution steam system, a compressor train, an acid gas removal system, and a product recovery train. The invention is not limited to these aspects, and this description should not be interpreted as excluding other forms of recovery facilities within the broader scope of the invention.

Fractionation System

As shown in FIG. 1, fractionation system 115 accepts steam cracker effluent (via line 113). Although these functionalities can be combined in a single separator, e.g., a fractionator, it is typical for the fractionation facility to include a vapor-liquid separator vessel (e.g., a tar knock-out drum) and a fractionator (e.g., a primary fractionator). The vapor-liquid separator vessel is configured for separating a primarily vapor-phase upgraded steam cracker effluent and a primarily liquid phase bottoms stream that comprising SCT, e.g., ≥90 wt. % of SCT based on the weight of the tar knock-out drum bottoms stream. The SCT may be present in the quenched steam cracker effluent and/or may be formed from at least a portion of the quenched steam cracker effluent's SCT precursors. The upgraded steam cracker effluent is conducted to the fractionator, which is configures to separate various products and co-products from the upgraded steam cracker effluent.

As shown in FIG. 1, the bottoms stream containing SCT may be removed via line 117. Besides the tar knock-out drum, fractionation system 115 also includes a primary fractionator and a quench tower. The quench tower and primary fractionator can be combined in a single vessel, (e.g., with one located above the other), but this is not required. Conventional tar knock-out drums, primary fractionators, and quench towers can be used, but the invention is not limited thereto. Suitable primary fractionators and associated equipment are described in U.S. Pat. No. 8,083,931 and U.S. Patent Publication No. 2016/0376511, which are incorporated by reference herein. Additional stages for removing heat (such as one or more transfer line heat exchangers) and removing tar (such as tar drums) can be located in or upstream of the primary fractionator, if desired.

Besides the quenching carried out in the furnace facility, the quenched steam cracker effluent may undergo additional cooling or quenching before being introduced to the tar knock-out drum, and/or as it is introduced to the tar knock-out drum. The temperature of the quenched steam cracker effluent entering the tar knock-out drum should be at a sufficiently low temperature to separate SCT from the quenched steam cracker effluent, and to accumulate the separated SCT in a lower region of the tar knock-out drum. It is observed that SCT separates rapidly at temperatures of about 350° C. or less, such as from about 200° C. to about 350° C. or from about 240° C. to about 320° C.

Conventional tar knockout drums can be used, but the invention is not limited thereto. For example, the tar knock-out drum can be a simple empty vessel, lacking distillation plates or stages. In certain embodiments, the tar knockout drum is an open flash zone in the bottom section of a fractionation tower, such as in the primary fractionator's flash zone. If desired, multiple knock-out drums may be connected in parallel such that individual drums can be taken out of service and cleaned while the plant is operating. SCT generally has a normal boiling point range having a $T_{90}$ ≥about 290° C., e.g., ≥about 500° C., such as ≥about 600° C., or greater, and typically comprises molecules, compounds, aggregates, and mixtures thereof having a molecular weight of about 212 g/mole or greater. The SCT accumulated in the tar knock-out drum typically has an initial normal boiling point ≥150° C., e.g., ≥200° C., such as in a range of from about 150° C. to about 320° C. Optionally, a purge stream can be introduced into the tar knock-out drum to lessen liquid-vapor contact. Typically, the purge stream is selected from steam, inert gas such as nitrogen, and substantially non-condensable hydrocarbons, such as those obtained from steam cracking, examples of which include steam cracker gas and tail gas.

Optionally, additional quenching of the quenched steam cracker effluent is carried out within the knock-out drum. The additional quenching can be carried out by feeding the quenched steam cracker effluent through a cool (less than 350° C.) quench fluid (such as one or more of the quench fluids described above). A cool quench fluid may be created by feeding a stream of SCT taken from the bottom of the tar knock-out drum through a suitable heat exchanger (e.g., a shell-and-tube exchanger, spiral wound exchanger, airfin, or double-pipe exchanger), and recycling the cooled SCT stream to the tar knock-out drum. In at least one embodiment, sufficient cooled SCT is recycled to reduce the temperature of the accumulated SCT in the tar knock-out drum from about 280° C. to about 150° C. The rate of asphaltene and SCT accumulation in line 113 and in the tar knock-out drum is observed to decrease when the accumulated SCT has a temperature of about 280° C. or less, as compared to the significantly greater temperature of the steam cracker effluent when leaving the radiant coil outlet. In another embodiment, the recycling suffices to reduce viscosity of the SCT removed from the tar knock-out drum to an extent sufficient to meet viscosity specifications, in the absence or reduction of an added externally sourced light blend stock otherwise necessary in the absence of such recycling. In another embodiment, the cooled SCT is introduced to the separation vessel so as to provide an average temperature for tar within the separation vessel of about 175° C. or less, such as about 150° C. or less. Quenching methods may be adjusted to prevent the formation of asphaltenes. It may be possible to prevent formation of up to about 70 wt. % of asphaltenes through quenching the steam cracker effluent via line 113 or within a tar knock-out drum.

Returning to FIG. 1, the upgraded steam cracker effluent is conducted to a fractionation system 115, for separation into a plurality of hydrocarbon product streams. The fractionation system typically includes a primary fractionator and a quench tower. Product streams that can be separated from the upgraded steam cracked effluent include one or more of (i) an oleaginous bottoms stream that can be used as a quench oil, (ii) an SCGO stream, which is sent away via line 119, the SCGO typically comprising about 90 wt. % or greater of $C_{10}$-$C_{17}$ hydrocarbon based on the weight of the SCGO, and having an $T_{90}$ boiling point from about 160° C. to about 290° C., (iii) a heavy pyrolysis gasoline stream ("heavy pygas stream" or "steam cracker naphtha") stream, which is sent away via line 121, typically including $C_5$-$C_{10}$ hydrocarbon, and (iv) a primarily vapor-phase process gas stream which is sent away via line 123. Typically, the pyrolysis results in a transfer to the heavy pygas stream of ≥0.5% of the pyrolysis feed's sulfur (weight basis), e.g., ≥1 wt. %, such as ≥2 wt. %, or ≥5 wt. %, or ≥10 wt. %, or ≥20 wt. %, or in the range of from 0.5 wt. % to 50 wt. %, or from 1 wt. % to 25 wt. %.

The upgraded steam cracker effluent may be introduced to the primary fractionator in a way that decreases contact with the vapor in the fractionator, for more effective fractionation. For example, spraying the upgraded steam cracker effluent into a vapor space within in the fractionator can result in undesirable vapor absorption into the upgraded steam cracker effluent. Instead, the upgraded steam cracker effluent can be introduced near the liquid-vapor interface in the bottom of the primary fractionator, which is observed to decrease vapor absorption into the upgraded steam cracker effluent. An optional baffle placed above the vapor-liquid interface can further decrease contact of the fractionation feed with vapor. Alternatively or in addition, the upgraded steam cracker effluent may be introduced to the primary fractionator in a way that decreases contact with the liquid in the fractionator. The fractionation feed may be sprayed into the vapor space allowing vapor and liquid components within the fractionation feed to separate rapidly.

Since in these aspects most if not all SCT is separated from the steam cracker effluent in the tar knock-out drum, the liquid-phase portion of the primary fractionator's contents comprises mainly heavy hydrocarbon. This primarily liquid-phase heavy hydrocarbon bottoms stream can be conducted away from the primary fractionator via line 117, e.g., for use as a quench oil. The viscosity of the primary fractionator's bottoms stream can be controlled by the addition of a light blend stock, which may be added directly to the bottom of the primary fractionator and provide cooling of the SCT stream. Such light blend stock may include SCGO, distillate quench oil and catalytic cycle oil and are characterized by viscosity at a temperature of 93° C. of about 1,000 centistokes (cSt) or less, such as about 500 cSt or less, or about 100 cSt or less.

SCGO may be condensed out of (or otherwise disengaged from) the vapor phase within the primary fractionator. A primarily vapor-phase overhead stream is conducted away from the primary fractionator, or alternatively can be conducted away from the primary fractionator section of combined primary fractionator-quench tower. The quench medium in this quench tower is typically water, which can be obtained from a variety of sources, for example, recycled refinery water, recirculated wastewater, clarified fresh water, purified wastewater, sour water stripper bottoms, overhead condensate, boiler feed water, or from other water sources or combinations of water sources. Water is commonly recycled from downstream oil water separators, sour water separators, and pygas strippers. The quench tower condenses at least a portion of pygas present in the vapor-phase effluent and the majority of the steam fed to the furnaces. In certain aspects, the primary fractionator's overhead stream is passed into a quench tower (or a quench section of a combined primary fractionator-quench tower), where the vapor is rapidly cooled (quenched) as the vapor passes through water (vapor or liquid). Condensed pygas and heated quench water are withdrawn from a location proximate to the bottom of the quench tower as a pygas stream 121.

A primarily vapor-phase overhead stream (referred to herein as a "process gas stream") is conducted away from the quench tower, and is transferred via line 123 to process gas compressor train 145 to produce a compressed process gas stream. The process gas stream typically comprises molecular hydrogen, light hydrocarbon (saturated an unsaturated), acid gases, and various forms of sulfur that are primarily vapor-phase under the fractionation conditions subsisting at the location where the quench tower overhead is conducted away from the quench tower. Other forms of sulfur are removed from other locations, e.g., from fractionator side draws and fractionator bottoms. When utilizing the specified hydrocarbon feed and the specified steam cracker conditions, the process gas stream can include, e.g., about 10 wt. % or greater of $C_{2+}$ olefin, about 1 wt. % or greater of $C_{6+}$ aromatic hydrocarbon, and/or about 0.1 wt. % or greater of any one of the following: diolefin, saturated hydrocarbon, molecular hydrogen, acetylene, $CO_2$, aldehyde, and $C_{1+}$ mercaptan. The process gas stream has a sulfur content (a "third" sulfur content) which is less than the second sulfur content of the steam cracker effluent of line 113. In some embodiments, the third sulfur content of the light hydrocarbon stream line 123 is about 7500 wppm or less, such as about 5000 wppm or less.

Sour Water Stripper and Dilution Steam System

Any hydrocarbon present in the quench water recovered from the quench tower (or combined quench tower-primary fractionator), e.g., by entrainment, may be separated from the recovered water in one or more oil-water separators. Such hydrocarbon typically has a range of normal boiling points spanning that of quench oil, SCGO, and pygas. The separated water component from the oil water separator may be recycled via water recycle line 125 to water regeneration system 127 which may include a sour water stripper and/or a dilution steam generator. The sour water stripper removes at least a portion of any hydrogen sulfide, and at least a portion of any ammonia present in the recycled water. Sour water stripping generally provides for at least a partial degasification of sour water, removing from the recycle water at least a portion of any remaining light hydrocarbon vapors and at least a portion of any remaining molecular hydrogen. The sour water stripper may be a steam-reboiled distillation column allowing for the overhead stripping of hydrogen sulfide and ammonia. Once the acid gas and ammonia have been removed, the upgraded water may be heated to produce steam, e.g., in a dilution steam generator. The dilution steam can be recycled via the following lines: (i) line 129 to hydrocarbon feed in line 101, (ii) line 131 to preheated hydrocarbon feed in line 105, (iii) line 133 to fractionation system 115, (iv) line 135 to a dilution steam blowdown system (not shown), or (v) any combination thereof. The overhead of the sour water stripper can be transferred via line 137 to water purge unit 139. Water purge unit 139 includes a condenser and a drum to allow for purge of KS and ammonia ($NH_3$) from the overhead of the sour water stripper. Partially upgraded water is generated in this process and can be recycled to the fractionation system via line 141 or for storage and/or use in other processes via line 143.

Process Gas Stream and Compressor Train

The process gas stream is conducted via line 123 (from FIG. 1) from the overhead of the quench tower to one or more stages of compressor train 145 to form a compressed process gas stream. Any water and heavy hydrocarbon recovered during and/or as a result of the compression can be recycled via line 147 to the fractionation system for reuse.

Although it is not required, the invention is compatible with combining the process gas stream (or one or more streams derived therefrom) with one or more refinery and/or petrochemical process streams, e.g., processes for producing one or more of fuels, lubricating oils, and petrochemicals. Doing so has been found to be efficient, especially when the available refinery streams contain molecular hydrogen and/ or $C_2$ to $C_4$ olefin. For example, during an interval of diminished process gas flow, excess capacity in process gas stream treatment and separation stages can be utilized for (i) removing one or more desired products, e.g., $C_2$-$C_4$ olefin, from the refinery and/or petrochemical streams and (ii) optionally recycling any remaining portion of the refinery and/or petrochemical streams (e.g., a portion comprising saturated hydrocarbon) for cracking as steam cracker furnace feed and/or combustion in steam cracker furnace burners, burners in other furnaces, etc. The process gas stream (or a stream derived therefrom) can be combined with one or more refinery and/or petrochemical process streams upstream and/or downstream of compressor train 145. Alternatively, or in addition, one or more of the indicated streams can be combined in between one or more stages of compressor trains 145.

Suitable refinery and petrochemical streams include those obtained or derived from one or more of cracking; hydroprocessing; alcohol production and/or alcohol conversion; reforming; conversion of natural gas to olefin; polymerization, including oligomerization; hydrocarbon combustion; and hydrocarbon distillation. Representative cracking processes include thermal and/or catalytic cracking, such as fluidized catalytic cracking. Representative hydroprocessing processes include catalytic and/or non-catalytic hydroprocessing, e.g., one or more of hydrotreating, hydrogenation (including hydrodearomatization), hydrodewaxing, dehydrogenation, hydrocracking, hydro-isomerization, and/or ring opening. Representative alcohol production and/or alcohol conversion processes include, e.g., catalytic and/or non-catalytic processes, such as alcohol synthesis processes (including oxo-alcohol processes) and alcohol conversion processes such as catalytic and/or non-catalytic alcohol dehydration.

In certain aspects, the process gas stream is combined with a light hydrocarbon gas obtained from a fluidized catalytic cracking (FCC) process, e.g., a process gas stream derived from an FCC fractionator overhead. Suitable fluidized catalytic crackers and equipment associated therewith and processes for operating same can include those disclosed in Handbook of Petroleum Refining Processes, 2d Ed., R. A. Meyers, 3.3-3.111, McGraw-Hill, but the invention is not limited thereto. For example, a refinery stream comprising a light hydrocarbon product derived from an FCC process, such as from an FCC fractionator overhead, can be combined (not shown) with the process gas stream at one or more locations in the processes illustrated by FIG. 1, such as by introducing the light hydrocarbon product into one or more of lines 123, 149, 153, 161, and 165; at least one stage of compression train 145; and one or more of vessels 151, 155, and 163. The location in the process at which the light hydrocarbon product is introduced may depend mainly on the types and amounts of impurities present therein. For example, besides light olefin, the light hydrocarbon product can contain one or more of molecular hydrogen, methane, ethane, propane, butanes, ammonia, carbon dioxide, arsine, mercury, hydrogen sulfide, carbonyl sulfide, mercaptans, and carbon disulfide, oxygenates and water.

In certain aspects, the light hydrocarbon product is treated to at least partially-remove one or more of the indicated non-olefinic compounds. The pretreatment can include, e.g., demethanizing the light hydrocarbon product in one or more demethanizers, to produce a tail gas and a demethanized $C_{2+}$ product. Conventional demethanizers can be used, e.g., one or more cryogenic demethanizers and/or one or more absorption demethanizers, but the invention is not limited thereto. Additional pretreatment stages can be used, e.g., for removing other non-hydrocarbon compounds from the light hydrocarbon product and/or the demethanized $C_{2+}$ product. Such additional pretreatment stages can include stages for removing at least a portion of one or more of ammonia, carbon dioxide, arsine, mercury, hydrogen sulfide, carbonyl sulfide, mercaptans, and carbon disulfide, oxygenates, and water. The pretreated light hydrocarbon product can be introduced as indicated into process gas stream and/or streams derived from the process gas stream.

Alternatively or in addition, at least a portion of one or more of the indicated one or more refinery and/or petrochemical process streams can be combined with feed to the steam cracking furnace, e.g., with one or more of a hydrocarbon feed, a desalted feed, a preheated feed, and the pyrolysis feed. Adventurously, this can be carried out with little or no pretreatment of the refinery and/or petrochemical process streams.

For simplicity, the following description will relate to processing a compressed process gas stream that has not been combined with a refinery and/or petrochemical process stream. The invention is not limited to this form of process gas stream processing, and this description should not be interpreted as excluding other forms within the broader scope of the invention, such as forms in which the process gas stream is combined with a refinery and/or petrochemical process stream.

Acidic Gas Removal System

The compressed process gas stream can be transferred via line 149 to amine tower 151 and caustic tower 155 to produce a purified process gas stream. The amine tower may accept a light amine stream including aqueous solutions of one or more of ethanolamine, diethanolamine, methyldiethanolamine, diisopropanolamine, diglycolamine, and other amines The amine tower removes acid gases, e.g., hydrogen sulfide and carbon dioxide, within rich amine stream to form a light hydrocarbon product stream. Suitable amine towers are described in U.S. Pat. Nos. 4,100,257; 4,112,051; and 4,894,178 incorporated by reference. A partially-purified process gas stream is conducted from the amine tower to the caustic tower for further treatment. The amine tower removes a major amount of $H_2S$ and $CO_2$ carried there with the process gas stream, e.g., removes substantially all of these acid gases. A caustic tower can be used to remove other forms of sulfur such as $C_1$ and $C_2$ mercaptan sulfur, e.g., substantially all of these compounds. Conventional caustic towers can be used, but the invention is not limited thereto.

In the aspects illustrated schematically in FIG. 1, a caustic tower 155 is configured to contact the partially-purified process gas stream with a caustic solution disposed in the caustic tower. The caustic solution may include any basic reagent capable of extracting at least a portion of any remaining acidic gases (including, e.g., hydrogen sulfide, carbon dioxide, and mercaptans) from the partially-purified process gas stream. For example, a caustic solution may include an aqueous solution of ammonia or an alkaline metal hydroxide, such as sodium or potassium hydroxide. The caustic tower may accept fresh caustic in line 157 and release spent caustic for regeneration through line 159. Conventional caustic towers and amine towers can be used, but the invention is not limited thereto. Suitable caustic towers are described in U.S. Pat. Nos. 2,998,382; 3,107,213, and 5,209,828, which are incorporated herein by reference. A purified process gas stream is conducted away via line 161.

Continuing with reference to FIG. 1, the purified process gas stream is transferred via line 161 to a sorbent system 163 that removes at least a portion of any residual water and optionally at least a portion of any residual nitrogen oxides in the purified process gas stream to produce an upgraded process gas stream. The upgraded process gas stream is conducted via line 165 to additional product separation and purification stages, e.g., for recovery of ethylene and propylene. When the need arises to regenerate one or more of the sorbents of sorbent system 163, the spent regeneration medium can be conducted away via line 167 for storage and/or further processing.

The upgraded process gas stream may be passed to a light hydrocarbon recovery train for separation and further purification of various hydrocarbon streams before further purification. Certain aspects of the light hydrocarbon recovery train will now be described in more detail with continued reference to FIG. 2. In these aspects, an initial separation is carried out in which a first stream comprising molecular hydrogen, methane, $C_2$ hydrocarbon, and some $C_{3+}$ hydrocarbon, and a second stream comprising $C_{3+}$ hydrocarbon are separated from the upgraded process gas stream in a fractionator 317. The invention is not limited to these aspects, and this description should not be interpreted as excluding other light hydrocarbon recovery trains within the broader scope of the invention, such as those in which (i) the first stream comprises methane and molecular hydrogen, and the second stream comprises $C_{2+}$ hydrocarbon, or (ii) the first stream comprises molecular hydrogen and $C_{3-}$ hydrocarbon, and the second stream comprises $C_{4+}$ hydrocarbon. In other words, the main components of the recovery facility can be in direct and/or indirect fluid communication.

Light Hydrocarbon Recovery Train

Figure 2:
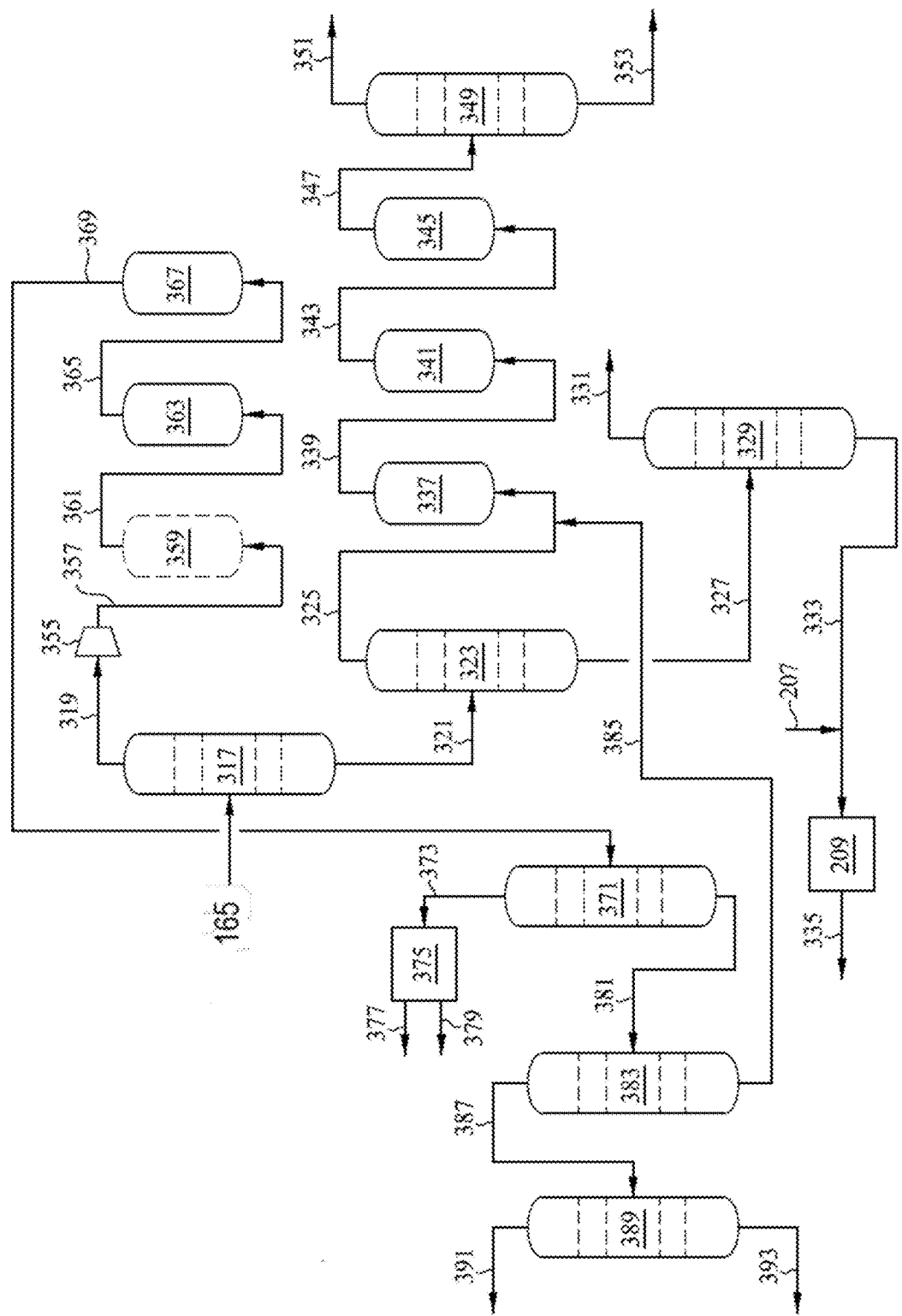
FIG. 2 is a flow diagram of an embodiment of a light hydrocarbon separation and purification process.

In the aspects shown in FIG. 2, separator 317 is utilized to separate from the upgraded process gas stream at least (i) a stream comprising molecular hydrogen, methane and $C_2$ hydrocarbons (with some $C_{3+}$), removed via line 319; and (ii) a stream comprising $C_{3+}$ hydrocarbon, removed via line 321. Fractionator 323 is utilized to separate from the stream comprising $C_{3+}$ hydrocarbons at least (i) a stream comprising $C_3$ hydrocarbon, removed via line 325, and (ii) a stream comprising $C_{4+}$ hydrocarbon, removed via line 327. Fractionator 329 is utilized to separate from the stream comprising $C_{4+}$ hydrocarbon at least (i) a stream comprising $C_4$ hydrocarbon, removed via line 331, and (ii) a pygas stream comprising $C_{5+}$ hydrocarbon, removed via line 333. Pygas obtained by separation and stripping from quench water associated with the quench tower can be introduced into the pygas stream of line 333 via line 207 to produce a combined pygas stream.

An optional $C_4$ recovery system can be used, e.g., one including equipment for fractionation, isomerization, and/or hydrogenation of the $C_4$ hydrocarbon stream removed via line 331. The $C_4$ recovery system can be used to recover one or more of butane, 1-butene, 2-butene, butadiene, or other products as desired. Conventional $C_4$ recovery systems can be used, but the invention is not limited thereto.

The combined pygas stream can be conducted to through gasoline hydrogenation stage 209 to produce various gasoline products that are sent away via line 335. Gasoline hydrogenation stage 209 which may include one or more units for pygas hydrogenation, a tailing tower and further fractionators (not shown). In at least one embodiment, gasoline hydrogenation stage 209 includes a first pygas hydrogenation unit located upstream of a tailing tower, with the tailing tower being located upstream of a second pygas hydrogenation stage. In certain aspects at least two streams are separated from the hydroprocessor effluent 335 (i) a stream containing $C_5$ hydrocarbon and at least a portion of any remaining DMS and (ii) a $C_{6+}$ hydrocarbon stream (which typically contains a lesser amount of $C_5$ hydrocarbon and DMS). If desired, at least a portion of the DMS in the $C_5$ hydrocarbon stream can be converted to a higher molecular weight sulfur compound. The $C_{6+}$ hydrocarbon stream can be introduced into a depentanizer for recovery of a purified $C_{6+}$ bottoms stream and an overhead stream that can be further processed for additional DMS.

The stream comprising $C_3$ hydrocarbon is typically conducted via line 325 to further processing stages which may include (i) a bed 337 for removing at least a portion of any methanol and COS, then through line 339 to (ii) a bed 341 for removing arsine, and through line 343 to (iii) methyl acetylene and propadiene (MAPD) converter 345 for hydrogenation. The purified stream comprising $C_3$ hydrocarbons is conducted via 347 to $C_3$ splitter 349 (e.g., a fractionator) for separation of at least propylene (sent away via line 351) and propane (sent away via line 353). Propane of line 353 may be recycled for further cracking or used in other refinery processes. The sulfur content of the COS lean $C_3$ hydrocarbon stream can be measured according to ASTM D5504. The sulfur content of the propylene can be measured according to ASTM D5504 (if measured as a gas), and ASTM D5623 (if measured as a compressed liquid). Suitable COS removal systems are described in U.S. Pat. Nos. 4,217,237; 4,217,238; and 7,427,385; which are incorporated herein by reference The stream conducted away from separator 317 via line 319 is transferred to compressor 355 for additional compression (e.g., compressor 355 is located downstream of compressor 301). From compressor 355 a stream comprising compressed molecular hydrogen, methane and $C_2$ hydrocarbons (with some $C_{3+}$) is conducted via line 357 to a series of purifications which may include (i) carbonyl sulfide removal bed 359, then through line 361 to (ii) arsine bed 363, and then through line 365 to (iii) $C_2$ acetylene converter 367. The purified stream comprising molecular hydrogen, methane, ethane, ethylene, and some $C_{3+}$ is passed through line 369 to separator 371. Separator 371 is utilized to separate from at least a portion of the purified stream of line 369 at least (i) a first stream comprising molecular hydrogen and methane, removed via line 373; and (ii) a second stream comprising $C_2$ hydrocarbon, this second stream being transferred via line 381 to fractionator 383. Fractionator 383 is used to separate from this second stream (i) any residual $C_{3+}$, e.g., for recycle via line 385 to line 325 which feeds methanol/COS bed 337; and (ii) a stream comprising purified $C_2$ hydrocarbon, which is removed via line 387 to $C_2$ splitter 389. $C_2$ splitter 389 is utilized to separate from the purified $C_2$ hydrocarbon at least (i) ethylene (sent away via line 391) and (ii) ethane (sent away via line 393). The sulfur content of the ethylene can be measured according to ASTM D5504 (if measured as a gas), and ASTM D5623 (if measured as a compressed liquid).

Ethane may be recycled for further cracking or used in other refinery processes. Additional separations are optionally carried out, e.g., utilizing separator 375 to separate from the tail gas stream of line 373 at least (i) methane, removed via line 377 and (ii) molecular hydrogen, removed via line 379. At least a portion of the separated methane may be used as fuel gas and/or steam cracked again for the production of syngas and hydrogen. At least a portion of the separated molecular hydrogen can be recycled to one or more hydrogenation units, e.g., as a hydrogen source in one or more SCT hydroprocessing stages.

Removal of Sulfur Species $H_2S$ may be removed at various locations in accordance with the methods, systems, and processes encompassed by the broader scope of the invention. Even so, sufficient $H_2S$ removal may be accomplished by operation of the combination of amine tower and caustic tower. In at least one embodiment, the amine tower removes about 99 wt. % or greater of the $H_2S$ from the compressed process gas stream, and the caustic tower removes substantially all of the remaining $H_2S$ from the partially-purified process gas stream. Some minor amounts (about 10 wppm or less) of $H_2S$ may be found in the water phase in dilution steam or various water purges, the dilution steam and/or water purges may be recycled to the quench tower or sour water stripper. Because $H_2S$ may be entrained in water, metallurgical upgrades of one or more hydrocarbon streams may be performed to portions of the steam cracking process to account for corrosion as may be caused by $H_2S$ in recycled water.

Likewise methyl mercaptan (MM) may be removed at various location. The amine tower may remove about 20 wt. % or more of the MM from the compressed process gas stream, depending on the quantities of $H_2S$ and $CO_2$ in the liquid on the trays within the amine tower. The caustic tower may remove about ≥70 wt. % of the remaining MM from the partially-purified process gas stream, e.g., ≥80 wt. %, such as ≥90 wt. %, or greater. It may be desirable for the $C_4$ recovery system to include stages for hydrogenation of $C_4$ hydrocarbon, e.g., to remove butadiene. Certain catalysts used for hydrogenation to remove butadiene have an upper limit of MM in the $C_4$ hydrocarbon stream of about 1 wppm. In these aspects, any residual MM in the $C_4$ hydrocarbon stream may be removed before the hydrogenation, e.g., by caustic treatment.

Likewise, ethyl mercaptan (EM) also may be removed at various locations, e.g., in the amine tower and/or caustic tower. The amine tower may remove about 20 wt. % or more of the EM from the compressed process gas stream, depending on the quantities of $H_2S$ and $CO_2$ in the liquid on the trays within the amine tower. The caustic tower may remove about 85 wt. % or greater of the EM from the partially-purified process gas stream. Any EM remaining in the upgraded process gas stream typically resides in the combined pygas stream, hydrotreating unit 209. In aspects where at least two pygas hydrogenation stages are used, with a tailing tower situated between them, about 95% or greater of the EM is converted to heavy sulfur forms in the first pygas hydrotreating stage and is separated and removed with a heavy oil byproduct of the hydrogenation.

Likewise carbonyl sulfide (COS) may be removed at various locations, including the amine tower and caustic tower. The amine tower may remove about 50 wt. % or more of the COS from the compressed process gas stream, depending on the quantities of $H_2S$ and $CO_2$ in the liquid on the trays within the amine tower. The caustic tower does not significantly decrease the amount of COS partially-purified process gas stream. Any remaining COS in the upgraded process gas stream typically resides in the $C_2$ hydrocarbon stream and the $C_3$ hydrocarbon stream, in a mass ratio range of about a 25:75 to 75:25. Since certain acetylene converter catalysts and certain MAPD converter catalysts are sensitive to sulfur compounds, a sorbent bed for COS removal is typically included before each of these converter. Typically, however, it is observed that COS is substantially absent from the $C_4$ hydrocarbon stream.

Likewise, carbon disulfide ($CS_2$) may be removed at various locations. The $CS_2$ is partitioned in fractionation system 115 (FIG. 1) with approximately 80 wt. % passing to the amine tower. 90 wt. % or more of the remainder of the $CS_2$ is observed to reside in bottoms stream 117 and pygas stream 121. The amine tower typically removes about 15% or more of the $CS_2$ from the compressed process gas stream. The caustic tower does not significantly decrease the amount of $CS_2$ in the partially-purified process gas stream. Any residual $CS_2$ in the upgraded process gas stream typically resides in the combined pygas stream. In aspects where at least two pygas hydrogenation stages are used, with a tailing tower situated between them, about 95% or greater of the $CS_2$ is converted to heavy sulfur forms in the first pygas hydrotreating stage and is separated and removed with a heavy oil byproduct of the hydrogenation.

Although dimethyl sulfide (DMS) is typically not removed from the compressed process gas stream or partially-purified process gas stream in the amine and caustic tower, and an appreciable amount can be found in the combined pygas stream. In aspects where at least two pygas hydrogenation stages are used, with a tailing tower situated between them, about 95% or greater of the DMS is converted to heavy sulfur forms in the first pygas hydrotreating stage and is separated and removed with a heavy oil byproduct of the hydrogenation. In aspects where the hydrogenated pygas stream is to be blended with gasoline, a hydrodesulfurization unit may be included as part pygas processing.

A major amount of thiophenic sulfur (e.g., thiophenes) in the upgraded steam cracker effluent is transferred in fractionation unit 115 to pygas stream 121, and from there to the combined pygas stream via line 207. In aspects where at least two pygas hydrogenation stages are used, with a tailing tower situated between them, then the first hydrotreating stage converts about 10 wt. % to about 30 wt. % of the thiophenes. In aspects which include a tailing tower upstream of the second hydrotreating stage, then about 20 wt. % to about 25 wt. % of the thiophenes are transferred to tailing tower bottom, and are removed with a heavy oil byproduct. One skilled in the art will appreciate that these discoveries concerning the partition and removal of thiophenes from the process, the second hydrotreating stage can be readily configured to remove most if not all of the remaining thiophenes transferred there from the tailing tower.

Sulfur forms in the steam cracker effluent having a normal boiling point in substantially the same range as SCT are removed with the tar knock-out drum's bottoms stream. This stream can be hydroprocessed, typically in the presence of a hydrocarbon diluent, to convert at least a portion of sulfur forms in the SCT to primarily vapor-phase forms having a lesser normal boiling point (e.g., $H_2S$). After separating $H_2S$, an upgraded SCT can then be conducted away.

Design of Light Hydrocarbon Recovery Train

Another aspect of the present disclosure is the design of refinery and/or petrochemical plant systems to compensate for different levels of sulfur compounds in a hydrocarbon feed that may be selected from a variety of crude oils having different sulfur forms and amounts. The use of a hydrocarbon feed with a greater content of sulfur compounds may involve changes to, or upgrading of, portions of the steam cracking process and/or particular equipment.

In at least one embodiment, the first sulfur content is used to determine whether a tailing tower should be connected after the first hydrotreating stage or after the second hydrotreating stage of a hydrotreating system containing multiple stages. For example, if the first sulfur content is about 4 wt. % or greater, the configuration of a tailing tower downstream of the first hydrotreating stage might be preferable, and/or if the first sulfur content is about 3 wt. % or less, the configuration of tailing tower downstream of the second hydrotreating stage might be preferable in order to produce a purified pygas product stream suitable for blending with gasoline products.

TABLE 1

| Sulfur Species | Pyrolysis Feed | Steam Cracker Effluent |
|---|---|---|
| Total Sulfur in Hydrocarbon Feed | 2800 | 2800 |
| $H_2S$ | Negligible | 1400 |
| Methyl Mercaptan | Negligible | 26 |
| Carbonyl sulfide | Negligible | 2.5 |
| Carbon disulfide | Negligible | 4 |
| $C_5$ Mercaptans | 2800 (primarily organic bounded) | 1.7 |
| Steam Cracked Naphtha Mercaptans | | 170 |
| Steam Cracked Gas Oil Mercaptans | | 134 |
| Tar Mercaptans | | 1000 |

Sulfur compounds can be effectively managed in accordance with the instant systems, methods, and processes by a variety of removal techniques, as shown in Table 2, which is compiled from processing a mixture of representative hydrocarbon feeds comprising crude oil. For example, a combination of an amine tower and a caustic tower may remove from the process gas stream about ≥90 wt. % of $H_2S$ in the process gas stream, about ≥70 wt. % of MM in the process gas stream, about ≥50 wt. % of EM in the process gas stream, about ≥50 wt. % of COS in the process gas stream, and about ≥15 wt. % of $CS_2$ in the process gas stream. A pygas hydrotreating unit (e.g., stage 209) may remove substantially all remaining EM, $CS_2$, and thiophenes in the pygas and/or combined pygas (dependent on multiple stages).

TABLE 2

| Contaminant | Location | % | Process | % |
|---|---|---|---|---|
| $H_2S$ | Amine tower inlet | 100 | Amine tower and caustic tower | 100 |
| | Water phase in dilution steam blowdown system and water purge unit | Minor | Recycles to quench tower and sour water stripper | |
| Methyl Mercaptan | Amine tower inlet | ≥90 | Amine tower | ≥20 |
| | | | Caustic tower | ≥70 |
| | Distillate stripper bottom | ≤10 | | |
| | $C_{4+}$ hydrocarbon stream | Balance | Caustic system | Balance |
| Ethyl Mercaptan | Amine tower inlet | ≥80 | Amine tower | ≥20 |
| | | | Caustic tower | ≥50 |
| | Distillate stripper bottom | ≤20 | Pygas hydrotreating unit | Balance |
| COS | Amine tower inlet | 100 | Amine tower | ≥50 |
| | | | Caustic tower | 0 |
| | $C_2$ hydrocarbon stream | 25-75 | COS-removal sorbent | 100 |
| | $C_3$ hydrocarbon stream | 25-75 | COS-removal sorbent | 100 |
| $CS_2$ | Amine tower inlet | ≥70 | Amine tower | ≥15 |
| | | | Caustic tower | 0 |
| | Distillate stripper bottom | ≤30 | Pygas hydrotreating unit | 100 |
| Thiophenes | $C_{5+}$ hydrocarbon stream | 100 | First pygas hydrotreating stage | 10-30 |
| | | | Tailing tower bottoms | 20-30 |
| | | | Second pygas hydrotreating stage | 100 |

EXAMPLES

Table 1 illustrates typical ranges for the amounts of sulfur-containing compositions (in wppm) for a high sulfur hydrocarbon feed after the flash separation vessel and again after steam cracking.

Overall, it has been found that a portion of the various forms of sulfur as may be introduced into a steam cracking process can be transformed in a predictable and pre-determined manner into other forms of sulfur. It has also been found that the predictable and pre-determined nature of the indicated transformations can be utilized to configure steam cracking furnace and recovery facilities to efficiently steam crack hydrocarbon feeds comprising heavy hydrocarbon and an appreciable amount of sulfur. In particular, pre-determined recovery facility can be configured without undue experimentation that was heretofore needed for (i) the efficient removal of sulfur (both forms of sulfur transformed by the steam cracking and forms that are not) and (ii) the recovery of desired products such as ethylene, propylene, $C_4$ hydrocarbon, and $C_{5+}$ hydrocarbon that meet or exceed product specifications. In other words, the discovery of the ways various forms of sulfur partition at various stages along a steam cracking process allows for design of steam cracking processes and equipment that may produce hydrocarbon-containing products having a lesser sulfur content than those of the prior art.

This disclosure can further include at least non-limiting aspects and/or embodiments:

A1. A steam cracking process, comprising:
providing a hydrocarbon feed comprising hydrocarbon and sulfur, the hydrocarbon feed having a first sulfur content;
introducing the hydrocarbon feed into a steam cracker integrated with a flash separation vessel to produce a steam cracker effluent having a second sulfur content that is less than the first sulfur content;
removing a sulfur-enriched stream from the flash separation vessel; and
introducing the steam cracker effluent to recovery facility to produce a process gas stream, wherein the process gas stream has a third sulfur content, the third sulfur content being less than the second sulfur content, wherein the process gas stream comprises $H_2S$ and methyl mercaptan.

A2. The process of A1, wherein the first sulfur content is at least 0.07 wt %, based on the total weight of the hydrocarbon feed.

A3. The process of A2, wherein the first sulfur content is at least 1.0 wt %, based on the total weight of the hydrocarbon feed.

A4. The process of any of A1 to A3, further comprising:
introducing the process gas stream to a compressor train to produce a compressed process gas stream;
introducing the compressed process gas stream to an amine tower, whereby a majority of the $H_2S$ and a portion of the methyl mercaptan in the compressed process gas stream are removed to form a partially-purified process gas stream;
introducing the partially-purified process gas stream to a caustic tower, whereby a portion of the $H_2S$, and a portion of the methyl mercaptan in the compressed process gas stream are removed to produce a purified process gas stream having a fourth sulfur content that is less than the third sulfur content; and
removing at least a portion of the water contained in the purified process gas stream to obtain an upgraded process gas stream.

A5. The process of A4, wherein the amine tower comprises tower trays having an outer weir of at least 75 mm.

A6. The process of A4 or A5, wherein the caustic tower comprises a once-through caustic cycle where a fresh stream of caustic enters the top of the caustic tower and is withdrawn at the bottom of the top section of the caustic tower to a caustic handling unit to effect removal of at least 80% of the methyl mercaptan from the compressed process gas stream by using the combination of the amine tower and the caustic tower.

A7. The process of any of A4 to A6, wherein the process gas stream further comprises ethyl mercaptan, and a portion of the ethyl mercaptan is removed in the amine tower, and a portion of the ethyl mercaptan is removed in the caustic tower.

A8. The process of any of A4 to A6, wherein the process gas stream further comprises COS, and a portion of the COS is removed in the amine tower.

A9. The process of A8, further comprising:
producing a C3− hydrocarbon stream comprising an alkyn and COS from the process gas stream;
removing at least a portion of the COS, preferably substantially all of the COS, from the C3− hydrocarbon stream to obtain a purified C3− hydrocarbon stream; and passing the C3− hydrocarbon stream to an alkyn converter to convert at least a portion of the alkyn to an olefin in the presence of an alkyn converting catalyst.

A10. The process of A9, wherein the alkyn converter is a front-end converter.

A11. The process of A9, wherein the C3− hydrocarbon stream is a C3 hydrocarbon stream, and the alkyn converter is an MAPD converter.

A12. The process of any of the preceding Embodiments, further comprising:
producing a C4 hydrocarbon stream comprising methyl mercaptan and 1,3-butadiene from the process gas stream;
passing the C4 hydrocarbon stream through a second caustic tower to remove the methyl mercaptan to obtain a purified C4 hydrocarbon stream; and
contacting the purified C4 hydrocarbon stream with molecular hydrogen and a hydrogenation catalyst to produce an upgraded C4 hydrocarbon stream comprising less 1,3-butadiene than the purified C4 hydrocarbon stream.

A13. The process of any of claims A4 to A12, wherein the process gas stream further comprises $CS_2$, and a portion of the $CS_2$ is removed in the amine tower.

A14. The process of any of the preceding Embodiments, further comprising:
producing a pygas stream from the process gas stream comprising ethyl mercaptan and/or $CS_2$;
optionally producing a heavy pygas stream comprising $CS_2$ from the steam cracker effluent; and
hydrotreating the pygas stream, optionally in combination with the heavy pygas stream, in a hydrofiner unit in the presence of a hydrofining catalyst.

A15. The process of any of the preceding Embodiments, wherein the process gas stream comprises dimethyl sulfide, and the process further comprises:
producing a pygas stream from the process gas stream comprising dimethyl sulfide;
optionally producing a heavy pygas stream comprising dimethyl sulfide from the steam cracker effluent; and
subjecting the pygas stream, optionally in combination with the heavy pygas stream, to hydrodesulfurization to remove at least a portion of the dimethyl sulfide therein.

A16. The process of any of the preceding Embodiments, wherein the process gas stream comprises thiophenes, and the process further comprises:
producing a pygas stream from the process gas stream comprising thiophenes;
optionally producing a heavy pygas stream comprising thiophenes from the steam cracker effluent; and
subjecting the pygas stream, optionally in combination with the heavy pygas stream, to hydrogenation to remove at least a portion of the thiophenes therein.

A17. A steam cracking process, comprising:
providing a hydrocarbon feed, wherein (i) the hydrocarbon feed comprises hydrocarbon and sulfur, and (ii) the hydrocarbon feed has a first sulfur content;

preheating the hydrocarbon feed to produce a preheated feed;

combining the preheated feed with steam to produce a steam cracking feed;

separating a primarily liquid-phase bottoms stream and a primarily vapor-phase pyrolysis feed from the steam cracking feed, wherein ≥20% of the hydrocarbon feed's sulfur (weight basis) resides in the pyrolysis feed;

pyrolysing the pyrolysis feed under pyrolysis conditions to produce a steam cracker effluent;

separating a steam cracker tar and an upgraded steam cracker effluent from the steam cracker effluent, wherein ≥25% of the pyrolysis feed's sulfur resides in the steam cracker tar; and separating a primarily liquid-phase pygas and a primarily vapor-phase process gas stream from the upgraded steam cracker effluent, wherein ≥0.5% of the pyrolysis feed's sulfur (weight basis) resides in the pygas.

A18. The process of A17, wherein at least part of the preheating is carried out in the convection section of at least one steam cracking furnace, wherein the steam cracking furnace further comprises a vapor-liquid separator integrated with the convection section and in fluidic communication with the convection section, and a pyrolysis section in fluidic communication with the convection section.

A19. The process of A18, wherein (i) the pyrolysis feed separation is carried out in the vapor-liquid separator, (ii) the pyrolysis feed is conducted to the pyrolysis section, (iii) at least part of the pyrolysis is carried out in the pyrolysis section, and (iv) the steam cracker effluent is conducted away from the pyrolysis section.

A20. The process of any of A17 to A19, further comprising quenching the steam cracker effluent before the separation of the steam cracker tar and the upgraded steam cracker effluent.

A21. The process of any of A18-A20, wherein from 0.5 wt. % to 50 wt. % of the pyrolysis feed's sulfur (weight basis) resides in the pygas.

A23. The process of any of the preceding Embodiments, wherein 25 wt. % to 75 wt. % of the hydrocarbon feed's sulfur reside in the pyrolysis feed.

A24. The process of any of A18-A23, wherein (i) ≥25 wt. % of the hydrocarbon feed's sulfur resides in the bottoms stream, with ≥90 wt. % of the remainder of the hydrocarbon feed's sulfur residing in the pyrolysis feed, and (ii) ≥25 wt. % of the hydrocarbon feed's hydrocarbon resides in the pyrolysis feed, with ≥90 wt. % of the remainder of the hydrocarbon feed's hydrocarbon residing in the bottoms stream.

A25. The process of any of A18-A24, further comprising (i) recovering from the process gas stream a stream comprising $C_4$ hydrocarbon and sulfur, and removing sulfur from one or more of the pygas, the steam cracker tar, and the stream comprising $C_4$ hydrocarbon and sulfur.

A26. A system for processing a hydrocarbon feed comprising sulfur and hydrocarbon, the system comprising:

at least one steam cracking furnace in fluidic communication a source of the hydrocarbon feed;

a flash separation vessel in fluidic communication with the steam cracking furnace;

at least one recovery facility in fluidic communication with and downstream of the steam cracking furnace, wherein the recovery facility includes (i) a compressor train;

(ii) an amine tower connected and downstream of the compressor train;

(iii) a caustic tower fluidly connected and downstream of the amine tower;

(iv) a drier fluidly connected and downstream of the caustic tower;

(v) a $C_2$ separator in fluidic communication with the drier;

(vi) a $C_3$ separator in fluidic communication with the drier;

(vii) a first COS-remover in fluidic communication with the $C_2$ separator;

(viii) an acetylene converter in fluidic communication with and downstream of the first COS-remover;

(ix) a second COS-remover in fluidic communication with the $C_3$ separator; and (x) a methyl acetylene and propadiene (MAPD) converter in fluidic communication with and downstream of the second COS-remover.

A27. The system of A26, wherein the $C_2$ separator is in direct and/or indirect fluidic communication with the drier.

A28. The system of A26 or A27, wherein the $C_3$ separator is in direct and/or indirect fluidic communication with the drier.

A29. The system of any of A26-A28, further comprising a $C_2$ splitter in fluidic communication with the acetylene converter, and a $C_3$ splitter in fluidic communication with the MAPD converter.

A30. A steam cracking process, comprising:

providing a hydrocarbon feed comprising hydrocarbon and sulfur;

introducing the hydrocarbon feed into a steam cracker to produce a steam cracker effluent;

introducing the steam cracker effluent to recovery facility to produce a process gas stream comprising mercaptan, $C_2$, $C_3$, and $C_4$ hydrocarbon;

separating $C_4$ hydrocarbon and mercaptan from the process gas stream; and upgrading the separated $C_4$ hydrocarbon, wherein at least a portion of the separated mercaptan is removed before the upgrading.

A31. A steam cracking process, comprising:

providing a hydrocarbon feed comprising hydrocarbon and sulfur;

introducing the hydrocarbon feed into a steam cracker to produce a steam cracker effluent comprising dimethyl sulfide, $C_2$-$C_4$ hydrocarbon, and $C_{5+}$ hydrocarbon;

separating from the steam cracker effluent a mixture comprising at least a portion of the dimethyl sulfide and at least a portion of the $C_{5+}$ hydrocarbon;

hydroprocessing the mixture to convert at least a portion of the dimethyl sulfide therein to a high molecular weight sulfur compound and produce a hydroprocessor effluent; and separating from the hydroprocessor effluent (i) a second mixture containing $C_5$ hydrocarbon and at least a portion of the dimethyl sulfide and (ii) a $C_{6+}$ hydrocarbon stream.

Although certain ranges are explicitly disclosed, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited. Those skilled in the art will appreciate that although certain aspects have been illustrated and described in more detail, various modifications can be made without departing from the spirit and scope of this disclosure. Likewise it will be appreciated that the term "comprising" is considered synonymous with the term "including", and that whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A steam cracking process, comprising:
   providing a hydrocarbon feed comprising hydrocarbon and sulfur, the hydrocarbon feed having a first sulfur content of at least 1 wt %, based on the total weight of the hydrocarbon feed;
   introducing the hydrocarbon feed having the first sulfur content into a steam cracker integrated with a flash separation vessel to produce a steam cracker effluent having a second sulfur content that is less than the first sulfur content;
   removing a sulfur-enriched stream from the flash separation vessel;
   introducing the steam cracker effluent to a recovery facility to produce a process gas stream, wherein the process gas stream has a third sulfur content, the third sulfur content being less than the second sulfur content, and wherein the process gas stream comprises H2S and methyl mercaptan;
   introducing the process gas stream to a compressor train to produce a compressed process gas stream;
   passing the compressed process gas stream through a first caustic tower to remove a portion of the $H_2S$ and a portion of the methyl mercaptan in the compressed process gas stream to produce a purified process gas stream having a fourth sulfur content that is less than the third sulfur content;
   separating a $C_2$ hydrocarbon stream, a $C_3$ hydrocarbon stream, and a $C_4$ hydrocarbon stream from the purified process gas stream, wherein the $C_4$ hydrocarbon stream comprises $C_4$ hydrocarbons and methyl mercaptan; and
   passing the $C_4$ hydrocarbon stream through a second caustic tower to remove at least a portion of the methyl mercaptan to obtain a purified $C_4$ hydrocarbon stream.

2. The process of claim 1, wherein the first sulfur content is at least 2 wt %, based on the total weight of the hydrocarbon feed.

3. The process of claim 2, wherein the first sulfur content is at least 3 wt %, based on the total weight of the hydrocarbon feed.

4. The process of claim 1, further comprising:
   introducing the compressed process gas stream to an amine tower, whereby a majority of the H2S and a portion of the methyl mercaptan in the compressed process gas stream are removed to form a partially-purified process gas stream, wherein the amine tower comprises tower trays having an outer weir of at least 75 mm, and wherein the partially-purified process gas stream is introduced into the first caustic tower such that the portion of the $H_2S$ and the portion of the methyl mercaptan are removed from the partially-purified process gas stream to produce the purified process gas stream; and
   removing at least a portion of the water contained in the purified process gas stream to obtain an upgraded process gas stream, wherein the $C_2$ hydrocarbon stream, the $C_3$ hydrocarbon stream, and the C4 hydrocarbon stream are separated from the upgraded process gas stream.

5. The process of claim 4, wherein the $C_3$ hydrocarbon stream comprises an alkyn and COS, the process further comprising:
   removing at least a portion of the COS from the $C_3$ hydrocarbon stream to obtain a purified $C_3$ hydrocarbon stream; and
   passing the $C_3$ hydrocarbon stream to an alkyn converter to convert at least a portion of the alkyn to an olefin in the presence of an alkyn converting catalyst.

6. The process of claim 5, wherein the alkyn converter is a front-end converter.

7. The process of claim 5, wherein the alkyn converter is an MAPD converter.

8. The process of claim 1, wherein the first caustic tower comprises a once-through caustic cycle where a fresh stream of caustic enters the top of the caustic tower and is withdrawn at the bottom of the top section of the first caustic tower to a caustic handling unit to effect removal of at least 80% of the methyl mercaptan from the compressed process gas stream by using the combination of the amine tower and the first caustic tower.

9. The process of claim 1, wherein the purified C4 hydrocarbon stream comprises 1,3-butadiene, the process further comprising:
   contacting the purified $C_4$ hydrocarbon stream with molecular hydrogen and a hydrogenation catalyst to produce an upgraded $C_4$ hydrocarbon stream comprising less 1,3-butadiene than the purified $C_4$ hydrocarbon stream.

10. The process of claim 1, further comprising:
    producing a pygas stream comprising ethyl mercaptan, $CS_2$, dimethyl sulfide, thiophenes, or a mixture thereof from the process gas stream;
    optionally producing a heavy pygas stream comprising $CS_2$, dimethyl sulfide, thiophenes, or a mixture thereof from the steam cracker effluent; and
    hydrotreating the pygas stream, optionally in combination with the heavy pygas stream, in a hydrotreating unit comprising a first hydrotreating stage, a second hydrotreating stage located downstream of the first hydrotreating stage, and a tailing tower, wherein:
    the tailing tower is located between the first hydrotreating stage and the second hydrotreating stage when the first sulfur content is about 4 wt % or greater, or
    the tailing tower is located downstream of the second hydrotreating stage when the first sulfur content is about 3 wt % or less, or
    the tailing tower is located between the first hydrotreating stage and the second hydrotreating stage or downstream of the second hydrotreating stage when the first sulfur content is between about 3 wt % and about 4 wt %.

11. A steam cracking process, comprising:
    providing a hydrocarbon feed, wherein (i) the hydrocarbon feed comprises hydrocarbon and sulfur, and (ii) the hydrocarbon feed has a first sulfur content of at least 1 wt %, based on the total weight of the hydrocarbon feed;
    preheating the hydrocarbon feed having the first sulfur content to produce a preheated feed having the first sulfur content;

combining the preheated feed with steam to produce a steam cracking feed having the first sulfur content, based on the total weight of the hydrocarbon feed in the steam cracking feed;

separating a primarily liquid-phase bottoms stream and a primarily vapor-phase pyrolysis feed from the steam cracking feed having the first sulfur content, wherein ≥20% of the hydrocarbon feed's sulfur (weight basis) resides in the pyrolysis feed;

pyrolysing the pyrolysis feed under pyrolysis conditions to produce a steam cracker effluent;

separating a steam cracker tar and an upgraded steam cracker effluent from the steam cracker effluent, wherein >25% of the pyrolysis feed's sulfur resides in the steam cracker tar;

separating a primarily liquid-phase pygas and a primarily vapor-phase process gas stream from the upgraded steam cracker effluent, wherein >0.5% of the pyrolysis feed's sulfur (weight basis) resides in the pygas, wherein the primarily vapor-phase process gas stream comprises methyl mercaptan, $C_2$, $C_3$, and $C_4$ hydrocarbons;

introducing the primarily vapor-phase process gas stream to a compressor train to produce a compressed process gas stream;

passing the compressed process gas stream through a first caustic tower to remove a portion of the $H_2S$ and a portion of the methyl mercaptan in the compressed process gas stream to produce a purified process gas stream;

separating a $C_2$ hydrocarbon stream, a $C_3$ hydrocarbon stream, and a $C_4$ hydrocarbon stream from the purified process gas stream, wherein the $C_4$ hydrocarbon stream comprises $C_4$ hydrocarbons and methyl mercaptan, and passing the $C_4$ hydrocarbon stream through a second caustic tower to remove at least a portion of the methyl mercaptan to obtain a purified $C_4$ hydrocarbon stream.

12. The process of claim 11, wherein from 0.5 wt % to 50 wt % of the pyrolysis feed's sulfur (weight basis) resides in the pygas.

13. The process of claim 11, wherein 25 wt % to 75 wt % of the hydrocarbon feed's sulfur reside in the pyrolysis feed.

14. The process of claim 11, wherein (i) ≥25 wt % of the hydrocarbon feed's sulfur resides in the bottoms stream, with ≥90 wt % of the remainder of the hydrocarbon feed's sulfur residing in the pyrolysis feed, and (ii) ≥25 wt % of the hydrocarbon feed's hydrocarbon resides in the pyrolysis feed, with ≥90 wt % of the remainder of the hydrocarbon feed's hydrocarbon residing in the bottoms stream.

15. The process of claim 11, further comprising sulfur, and removing sulfur from one or more of the pygas and the steam cracker tar.

16. The process of claim 11, further comprising introducing the pygas into a hydrotreating unit comprising a first hydrotreating stage, a second hydrotreating stage located downstream of the first hydrotreating stage, and a tailing tower, wherein:

the tailing tower is located between the first hydrotreating stage and the second hydrotreating stage when the first sulfur content is about 4 wt % or greater, the tailing tower is located downstream of the second hydrotreating stage when the first sulfur content is about 3 wt % or less, or the tailing tower is located between the first hydrotreating stage and the second hydrotreating stage or downstream of the second hydrotreating stage when the first sulfur content is between about 3 wt % and about 4 wt %.

17. The process of claim 11, further comprising:

introducing the compressed process gas stream to an amine tower, whereby a majority of the $H_2S$ and a portion of the methyl mercaptan in the compressed process gas stream are removed to form a partially-purified process gas stream, wherein the amine tower comprises tower trays having an outer weir of at least 75 mm, and wherein the partially-purified process gas stream is introduced into the first caustic tower to produce the purified process gas stream.

18. A steam cracking process, comprising:

providing a hydrocarbon feed comprising hydrocarbon and sulfur, wherein the hydrocarbon feed has a first sulfur content of at least 1 wt %, based on the total weight of the hydrocarbon feed;

introducing the hydrocarbon feed having the first sulfur content into a steam cracker to produce a steam cracker effluent;

separating a process gas stream comprising methyl mercaptan, $C_2$, $C_3$, and $C_4$ hydrocarbons from the steam cracker effluent;

introducing the process gas stream to a compressor train to produce a compressed process gas stream;

passing the compressed process gas stream through a first caustic tower to remove a portion of the methyl mercaptan in the compressed process gas stream to produce a purified process gas stream;

separating a $C_2$ hydrocarbon stream, a $C_3$ hydrocarbon stream, and a $C_4$ hydrocarbon stream from the purified process gas stream, wherein the $C_4$ hydrocarbon stream comprises $C_4$ hydrocarbons and methyl mercaptan;

passing the $C_4$ hydrocarbon stream through a second caustic tower to remove at least a portion of the methyl mercaptan to obtain a purified $C_4$ hydrocarbon stream; and upgrading the purified $C_4$ hydrocarbon stream.

19. The process of claim 18, wherein a $C_{4+}$ hydrocarbon stream is separated from the purified process gas stream, wherein a pygas stream comprising $C_{5+}$ hydrocarbon and the $C_4$ hydrocarbon stream are separated from the $C_{4+}$ hydrocarbon stream, the process further comprising:

hydrotreating the pygas stream in a hydrotreating unit comprising a first hydrotreating stage, a second hydrotreating stage located downstream of the first hydrotreating stage, and a tailing tower, wherein:

the tailing tower is located between the first hydrotreating stage and the second hydrotreating stage when the first sulfur content is about 4 wt % or greater, or the tailing tower is located downstream of the second hydrotreating stage when the first sulfur content is about 3 wt % or less, or the tailing tower is located between the first hydrotreating stage and the second hydrotreating stage or downstream of the second hydrotreating stage when the first sulfur content is between about 3 wt % and about 4 wt %.

20. A steam cracking process, comprising:

providing a hydrocarbon feed comprising hydrocarbon and sulfur, wherein the hydrocarbon feed has a first sulfur content of at least 1 wt %, based on the total weight of the hydrocarbon feed;

introducing the hydrocarbon feed having the first sulfur content into a steam cracker to produce a steam cracker effluent;

separating a process gas stream comprising methyl mercaptan, dimethyl sulfide, and $C_2$-$C_{5+}$ hydrocarbons from the steam cracker effluent;

introducing the process gas stream to a compressor train to produce a compressed process gas stream;

passing the compressed process gas stream through a first caustic tower to remove a portion of the methyl mercaptan in the compressed process gas stream to produce a purified process gas stream;

separating a $C_2$ hydrocarbon stream, a $C_3$ hydrocarbon stream, a $C_4$ hydrocarbon stream, and a $C_{5+}$ hydrocarbon stream from the purified process gas stream, wherein the $C_4$ hydrocarbon stream comprises $C_4$ hydrocarbons and methyl mercaptan, and wherein the $C_{5+}$ hydrocarbon stream comprises $C_{5+}$ hydrocarbons and dimethyl sulfide;

passing the $C_4$ hydrocarbon stream through a second caustic tower to remove at least a portion of the methyl mercaptan to obtain a purified $C_4$ hydrocarbon stream;

hydroprocessing the $C_{5+}$ hydrocarbon stream to convert at least a portion of the dimethyl sulfide therein to a high molecular weight sulfur compound and produce a hydroprocessor effluent; and separating from the hydroprocessor effluent (i) a $C_5$ hydrocarbon stream comprising $C_5$ hydrocarbons and at least a portion of the dimethyl sulfide and (ii) a $C_{6+}$ hydrocarbon stream.

21. The process of claim 18, further comprising:

introducing the compressed process gas stream to an amine tower, whereby a majority of the $H_2S$ and a portion of the methyl mercaptan in the compressed process gas stream are removed to form a partially-purified process gas stream, wherein the amine tower comprises tower trays having an outer weir of at least 75 mm, and wherein the partially-purified process gas stream is introduced into the first caustic tower to produce the purified process gas stream.

22. The process of claim 20, wherein:

the $C_{5+}$ hydrocarbon stream is hydroprocessed in a hydrotreating unit comprising a first hydrotreating stage, a second hydrotreating stage located downstream of the first hydrotreating stage, and a tailing tower, the tailing tower is located between the first hydrotreating stage and the second hydrotreating stage when the first sulfur content is about 4 wt % or greater, or the tailing tower is located downstream of the second hydrotreating stage when the sulfur content is about 3 wt % or less, or the tailing tower is located between the first hydrotreating stage and the second hydrotreating stage or downstream of the second hydrotreating stage when the sulfur content is between about 3 wt % and about 4 wt %.

23. The process of claim 20, further comprising:

introducing the compressed process gas stream to an amine tower, whereby a majority of the $H_2S$ and a portion of the methyl mercaptan in the compressed process gas stream are removed to form a partially-purified process gas stream, wherein the amine tower comprises tower trays having an outer weir of at least 75 mm, and wherein the partially-purified process gas stream is introduced into the first caustic tower to produce the purified process gas stream.

* * * * *